United States Patent [19]
Bates et al.

[11] Patent Number: 6,088,707
[45] Date of Patent: Jul. 11, 2000

[54] COMPUTER SYSTEM AND METHOD OF DISPLAYING UPDATE STATUS OF LINKED HYPERTEXT DOCUMENTS

[75] Inventors: Cary L. Bates; Paul R. Day, both of Rochester, Minn.

[73] Assignee: International Business Machines Corporation, Armonk, N.Y.

[21] Appl. No.: 08/944,222

[22] Filed: Oct. 6, 1997

[51] Int. Cl.[7] .................................................. G06F 17/30
[52] U.S. Cl. .......................................... 707/501; 707/513
[58] Field of Search ..................... 707/501, 513

[56] References Cited

U.S. PATENT DOCUMENTS 5,870,769  2/1999  Freund ..................................... 707/501

OTHER PUBLICATIONS

House 5 Productions ("Url homepage and download", http://appollo.rsn.hk–r.se/~pt95vma/urlwatch.html), Aug. 11, 1997.
Garaffa ("Netscape Communicator 4.0 & 4.1 News !", http://browserwatch.internet.com/news/story/netscape261.html), Apr. 25, 1997.
Screen Printout 1, (Netscape Communicator, History), Sep. 2, 1999.
"Netscape SmartMarks Quick Start Guide", http://search.netscape.com/home/add_ons/smrtmrks2_0_qstart.html, downloaded Aug. 11, 1997.
"Netscape SmartMarks Quick Start Guide", http://search.netscape.com/home/add_ons/smrtmrks1_0_qstart.html, downloaded Aug. 11, 1997.
"UrlWatch homepage and download", http://apollo.rsn.h-k–r.se/~pt95vma/urlwatch.html, downloaded Aug. 11, 1997.
"ALTAIR Technologies Internet Software", http://www.ivc-s.net/altair/internet.htm, downloaded Aug. 11, 1997.
"Quick Tour of SiteShare", http://www.sitesshare.com/quick.htm, downloaded Aug. 11, 1997.

*Primary Examiner*—Thomas G. Black
*Assistant Examiner*—William Trinh
*Attorney, Agent, or Firm*—Wood, Herron & Evans, L.L.P.

[57] ABSTRACT

A computer system and method of displaying hypertext documents indicate an update status for a particular hypertext document in association with the display of a hypertext link definition pointing to that document. In addition, one or more specific notification criteria are utilized to determine when a document has been updated. A notification criteria may be based upon a user selection of a selected portion of a document, such that changes to another portion of the document do not trigger an indication of an updated document. A notification criteria may also be based on a specific keyword search criteria selected by a user. A notification criteria may further be based on a relative change threshold for a document, such that changes to a document falling below the threshold are not indicated to a user. In addition, a notification criteria function may be based upon updates made by a particular author of a document, such that specific authors may either trigger or not trigger notification of an updated document.

66 Claims, 15 Drawing Sheets

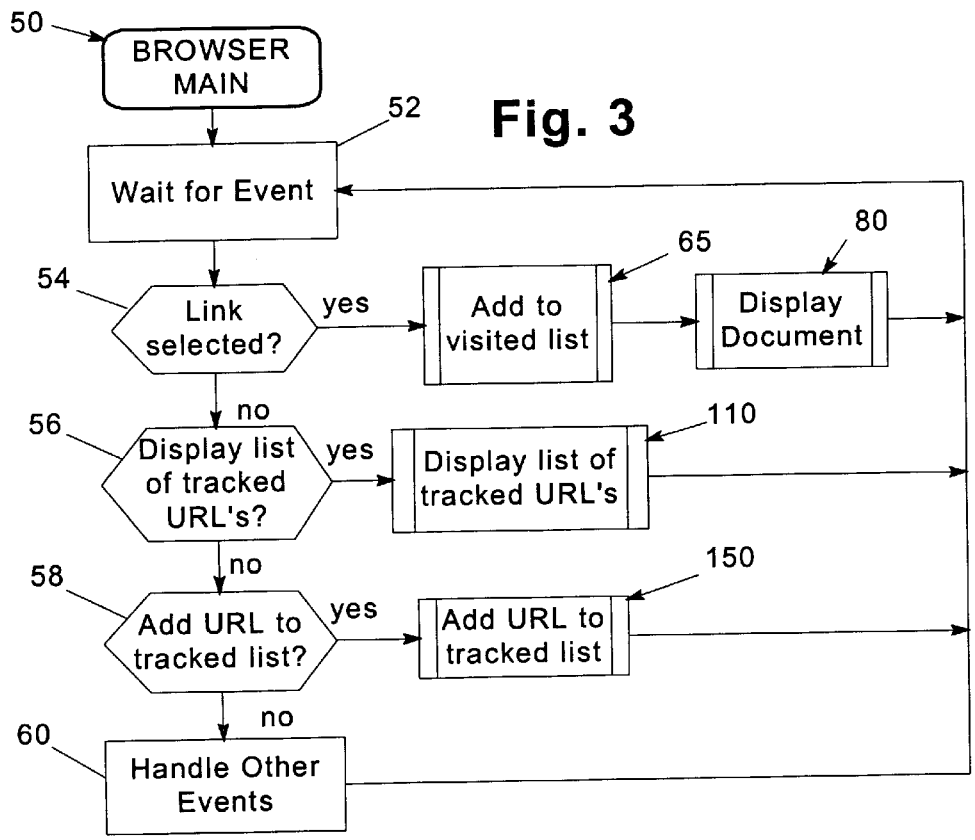
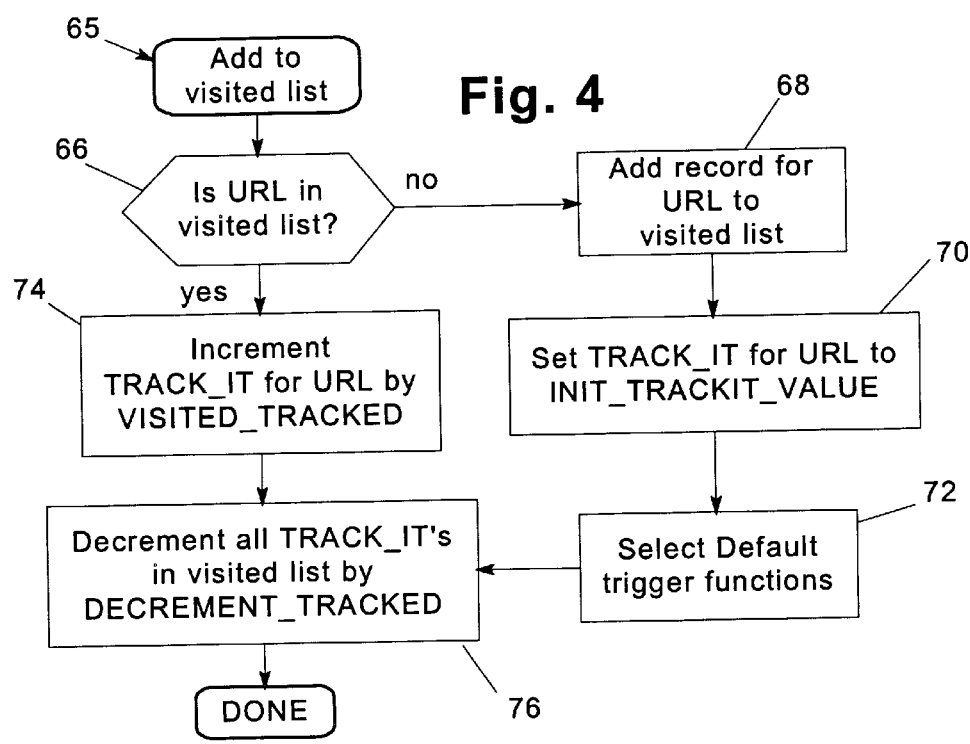

COMPUTER SYSTEM AND METHOD OF DISPLAYING UPDATE STATUS OF LINKED HYPERTEXT DOCUMENTS

FIELD OF THE INVENTION

The invention is generally related to computers and computer software. More specifically, the invention is generally related to a manner of displaying the update status of documents on a computer display.

BACKGROUND OF THE INVENTION

As a result of the explosive growth of public networks such as the Internet, and specifically, a portion of the Internet known as the World Wide Web ("the Web"), the quantity of information available to computer users has risen drastically. Users typically view documents from the Web using a computer software application known as a browser that displays all or a portion of a particular document in one or more graphical windows.

Documents on the Web are formatted using a standard language known as the Hypertext Markup Language (HTML), and navigation between documents is typically handled through hypertext links defined between a source location in one document and a target location in the same or another document. A user navigates from the source to the target typically by selecting a hypertext link definition at the source location. In addition, a hypertext link definition can be associated with a particular object displayed in a document so that the associated object may be selected by a user to activate a hypertext link. Hypertext link definitions may be associated with a wide variety of display objects such as text, images, sounds, animation, and video clips, among others.

Users can often find information on the Internet about practically any subject of interest, with new subjects and new information about those subjects being added every day. However, the Internet is inherently unstructured, and it is often difficult to find all of the information about a particular subject of interest without significant searching. Moreover, many users find that a great deal of this information is not very useful, and as a result, many users also waste a significant amount of time browsing through worthless information.

To stem the tide of "information overload", many users maintain lists of favorite locations where they have found useful information about various subjects of interest. These favorite locations may be stored in a bookmark (or favorites) list for later retrieval by a user. Typically, a bookmark list is accessed using a drop-down menu or a separate window for the browser. In addition, many lists permit users to organize favorite locations into one or more folders based upon the subject matter of the locations.

It is common for users to check on favorite locations from time to time to keep current on a particular area of interest. However, a great deal of time is often wasted visiting favorite locations that have not been updated since the last time a user visited. As users add more and more favorite locations to their lists, the amount of time wasted when visiting stale documents increases, and it often becomes unproductive to check all of the users' favorite locations for new material on a recurring basis.

Many browsers do some rudimentary checking of the update status of locations stored in a user's bookmark or favorites list. Typically, the checking is performed by comparing the current contents of a location with a cached, or local copy, of the contents that was stored the last time a user visited the location. The contents checked by a browser may also be limited to just the hypertext links, or everything but the hypertext links. In addition, the size of a document stored at a particular location may be compared to the size of a cached copy of a document to determine whether a location has been updated since a last visit. Updated locations are typically indicated within a bookmark or favorite list using a separate icon preceding the display of each updated location.

Conventional manners of indicating the update status of documents at given locations are limited in several respects. First, only bookmarked locations, which a user must have manually stored in the browser at one point or another, are checked. A burden is therefore placed on a user to ensure that all locations to be monitored are stored and organized in a bookmark list. Second, the only manner of indicating the update status of a document location is in a bookmark list, thereby requiring a user to open a separate menu or window to view update status information. Third, practically any change to a document, no matter how insubstantial, can trigger the indication of an updated location. As an example, it may be frustrating for a user to specifically navigate to a document believed to contain new information, only to find that a minor formatting change has been implemented with no modification to the document's content.

Therefore, a significant need continues to exist for a manner of improving the determination and display of the update status of documents.

SUMMARY OF THE INVENTION

The invention addresses these and other problems associated with the prior art in providing a computer system and method of displaying hypertext documents in which an indication of an update status for a particular hypertext document is indicated in association with the display of a hypertext link definition pointing to that document. Consequently, users can determine from viewing the hypertext link definitions within a given hypertext document whether any of the hypertext documents linked to the given document have been updated. In many applications, no additional steps such as opening menus or separate windows are required to determine the update status of documents linked to a currently-displayed hypertext document.

The invention addresses additional problems associated with the prior art in providing a computer system and method of monitoring the update status of documents in which one or more specific notification criteria are utilized to provide a flexible and customizable manner of determining whether a document contains updated information of interest to a user. With each type of notification criteria, it is possible to minimize the indication of an updated document as a result of inconsequential updates to the document, thereby providing more informative update status information to a user.

A notification criteria may be based upon a user selection of a selected section of a document defined by start and end positions therein. As a result, notification of a document update may be limited solely to updates within the selected section, or in the alternative, updates within the selected section may be specifically excluded from notification. A notification criteria may also be based on a specific keyword search criteria selected by a user. Furthermore, a notification criteria may be based upon updates made by a particular author of a document, such that specific authors may either trigger or prevent from triggering notification of an updated document. In addition, a notification criteria may be based on a relative change threshold for a document, such that notification of an update occurs only in response to changes to a document that exceed the threshold.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

BRIEF DESCRIPTION OF THE DRAWING

FIG. 3 is a flowchart illustrating the program flow for the main routine of a browser consistent with the invention.

FIG. 4 is a flowchart illustrating the program flow of the add to visited list routine of FIG. 3.

DETAILED DESCRIPTION

The embodiments described hereinafter may be used to monitor and display the update status of documents stored at various locations on one or more computer systems. In one preferred application, the embodiments are used to monitor and display the update status of hypertext documents, e.g., in HTML format, that are stored on public computer networks such as the World Wide Web portion of the Internet, and that are viewable through a browser computer application executing on a computer system. Documents are typically identified on the Internet via an address known as a Uniform Resource Locator (URL).

It should be appreciated that the embodiments may have other useful applications consistent with the invention. For example, it should be understood that a number of private and corporate networks are configured as "intranets" or "extranets", where data is organized, stored and retrieved in an HTML format, similar to documents on the Internet. Moreover, documents in other formats than HTML may be updated periodically and thus may be monitored by embodiments of the invention. In general, any documents that are stored on one or more computer systems and that are updated from time to time may be monitored consistent with the invention.

Prior to discussing a specific embodiment of the invention, a brief description of exemplary hardware and software environments for use therewith is provided.

Hardware Environment

Figure 1:
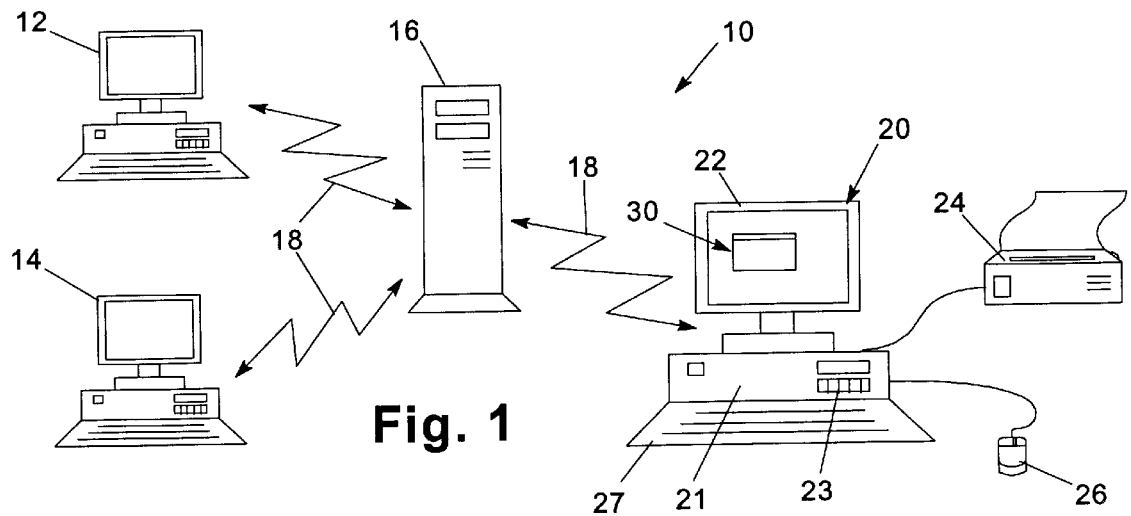
FIG. 1 is a block diagram of a computer system consistent with the invention.

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22 (e.g., a CRT, an LCD display or other display device); storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. For example, one such computer software application is a hypertext browser 30, a window of which is displayed on computer display 22. Moreover, various applications, programs, objects, modules, etc. may also execute on one or more processors in server 16 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the invention.

Software Environment

Figure 2:
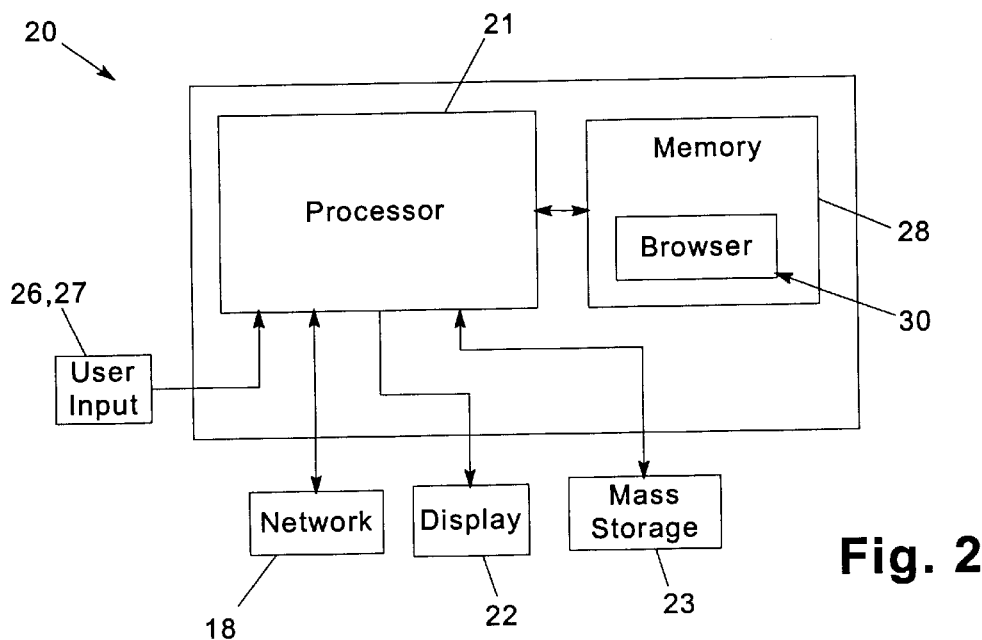
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

A browser 30 is illustrated as resident in memory 28. However, it should be appreciated that browser 30 may be stored on network 18 or mass storage 23 prior to start-up, and in addition, may have various components that are resident at different times in any of memory 28, mass storage 23, network 18, or within registers and/or caches in processor 21.

Browser 30 processes hypertext documents for viewing. The hypertext documents may be retrieved from mass storage 23 or over network 18, e.g., through an Internet connection. Moreover, hypertext documents may be cached from time to time in the memory 28 and/or mass storage 23 once they are viewed to accelerate subsequent viewing by a user.

It should be appreciated that other software environments may be utilized in the alternative.

Display of Document Update Status

FIG. 3 illustrates the program flow of a main routine 50 for browser 30. Routine 50 is disclosed as an event-driven system, whereby system events are waited for by browser 30 in block 52 and handled as they are received. Several events that perform various operations consistent with the invention are detected and handled at blocks 54–58. Other events that are not relevant to the invention are handled in a conventional manner as shown at block 60.

In the embodiment illustrated in FIG. 3, update status information is maintained for two types of documents. First, update status information is maintained for documents that have been previously visited by a user. Such documents are maintained in a "visited" list, and are handled during processing of a link selected event at block 54 of routine 50. Second, a user is permitted to select specific documents to track by building a "tracked" list that is handled via a pair of events detected in blocks 56 and 58 (described in greater detail below).

Visited documents are monitored on an automatic basis, typically with certain parameters being configurable by a user to customize the monitoring function. Typically, once a user has set up suitable configuration parameters, visited documents are monitored in the background with little or no specific action required from the user. To minimize the user action required to monitor visited documents, therefore, the functionality for monitoring such documents is implemented into the processing that occurs whenever a hypertext link definition is selected by a user, indicating that a user wishes to navigate to a new hypertext document.

As shown in block 54, in response to the selection of a hypertext link definition, a routine 65 is first executed to add a new document, which is the target of the link definition, to the visited list. Next, a display document routine 80 is executed to render the target hypertext document on the computer display.

Routine 65 is illustrated in greater detail in FIG. 4. First, in block 66, a visited list or other data structure is searched to determine whether the target document for the hypertext link definition is present in the list. Typically, each document is identified by an identifier such as a uniform resource locator (URL) or other suitable manner of identifying a particular location in which the document resides. For example, on private networks, another identifier such as the file name and path information may be used.

Figure 5:
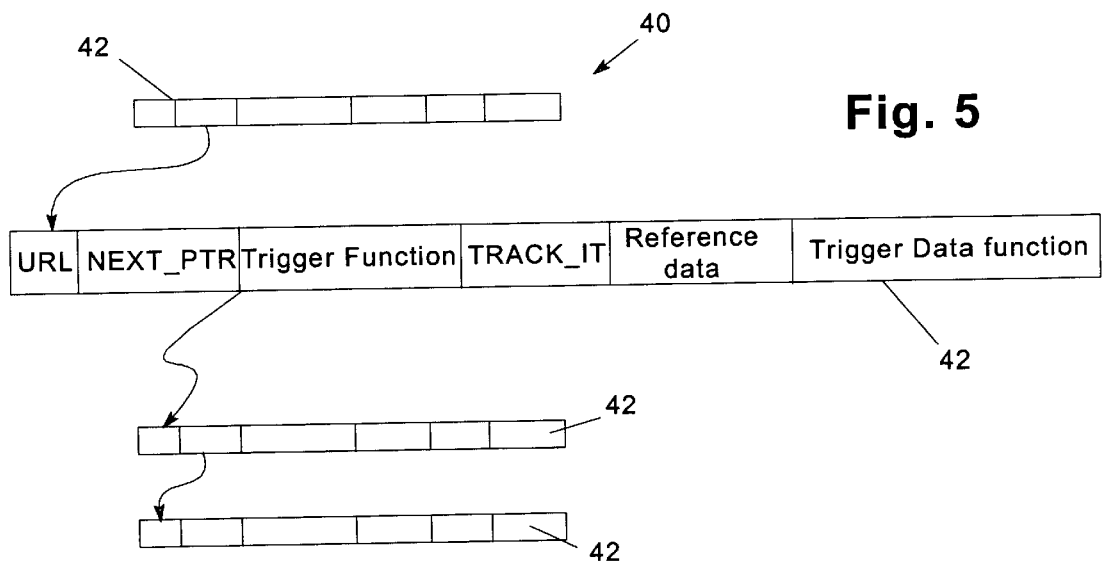
FIG. 5 is a block diagram of a visited list consistent with the invention.

FIG. 5 illustrates one suitable data structure for implementing a visited list 40. List 40 includes a plurality of records 42, each including an identifier such as the URL for the document, as well as a pointer to the next record in a list, here identified as "NEXT_PTR". Each record also includes a trigger function, a TRACK_IT variable, reference data, and a trigger data function. The reference data is a data structure including suitable information for identifying the last known state of the document, typically information regarding the contents of the document as of the last time the document was visited. The trigger function analyzes the current contents of the document selected according to a predetermined notification criteria and compares the results to the reference data to determine whether the document has been updated. The trigger data function updates the reference data for the document based upon the current contents of the document. The TRACK_IT variable is utilized to set a minimum threshold for documents to be tracked, such that only documents that have a frequency of visit above the threshold are monitored on a regular basis.

Consistent with the invention, any of a number of types of trigger functions may be implemented to analyze documents according to various types of notification criteria. Several types of trigger functions consistent with the invention will be described below.

It should also be appreciated that each record in the visited list may be implemented using any known data structures. For example, the actual program code for the trigger functions may be stored in the record. In the alternative, pointers to generic, or shared, trigger functions may instead be stored in each record, with any additional customization information that is required to call a generic trigger function with the specific notification criteria specified for the record stored directly in the record. For example, for a keyword trigger function (discussed in greater below), a trigger function field of each record may include a pointer to the generic keyword trigger function, with the text of the keyword search criteria included within the record for use as a parameter to the generic keyword's trigger function. Other data structures may be used in the alternative.

Returning to FIG. 4, if the URL of the target document is not in the visited list, control passes to block 68 to add a record to visited list 40 for the current document. The TRACK_IT variable for the current document is set to an initial value designated as INIT_TRACKIT_VALUE in block 70. Next, in block 72, a default pair of trigger and trigger data functions are selected and stored in the record for the targeted document. Next, in block 76, the TRACK_IT variables for each document in the visited list are decremented by a value designated as DECREMENT_TRACKED.

Returning to block 66, if the target document is in the visited list, block 74 is executed to increment the TRACK_IT variable for the document by a constant value designated VISITED_TRACKED. Next, control is passed to block 76 to decrement all the TRACK_IT variables in the visited list.

The values for the constants INIT_TRACKIT_VALUE and VISITED_TRACKED are greater than the constant DECREMENT_TRACKED so that over time routine 65 decays the TRACK_IT values for documents in the visited list that have not been recently visited. The more often that a document is visited, the greater its TRACK_IT value will be. Likewise, a document that is not been visited for some time will have a very low TRACK_IT value. It should be appreciated that the INIT_TRACKIT_VALUE, VISITED_TRACKED and DECREMENT_TRACKED constants may be selected to limit to a greater or lesser extent the number of visited documents that are monitored on a continual basis. Moreover, such constants may be selectable by a user.

Various modifications may be made to routine 65 consistent with the invention. For example, routine 65 may also perform maintenance of visited list 40, e.g., through removing records in the list whose TRACK_IT values fall below predetermined thresholds. Moreover, it should be appreciated that other data structures may be used to implement the visited list consistent with the invention.

Figure 6:
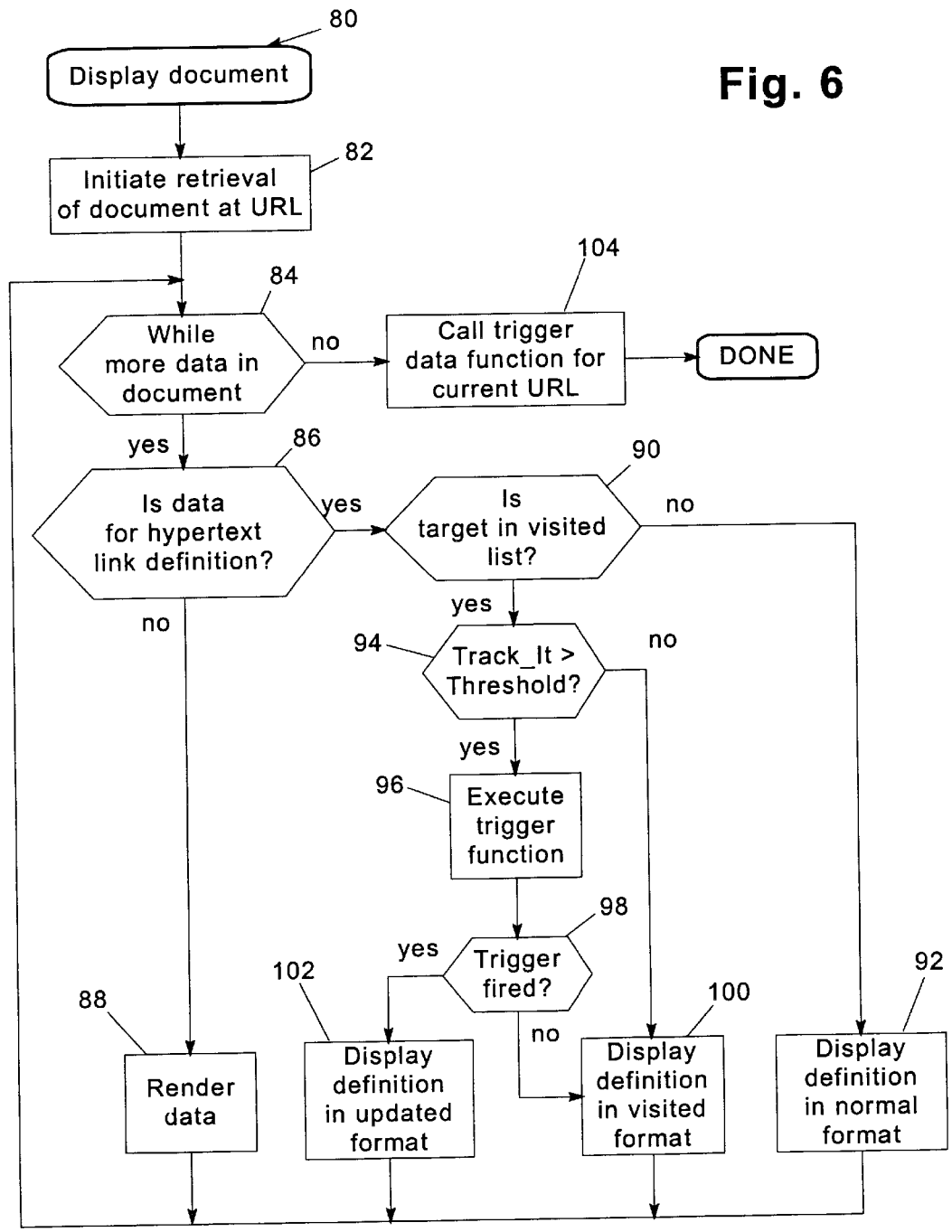
FIG. 6 is a flowchart illustrating the program flow of the display document routine of FIG. 3.

FIG. 6 illustrates display document routine 80 in greater detail. In this routine, retrieval of the document indicated at the URL specified in the selected link is initiated in block 82. Next, a while loop is initiated in block 84 to retrieve all of the data for the document. As long as additional data remains to be processed, block 86 is executed to determine whether the data received for the document includes a hypertext link definition. If not, the document data is rendered on a computer display in block 88 in a manner well known in the art. If a hypertext link definition is found in the document data, control is passed instead to block 90 to determine whether the target of the hypertext link definition is found in the visited list. If the target is not, control is passed to block 92 to display the link definition in a normal format, prior to returning control to block 84 to handle additional document data. If the target is found in the visited list, however, control is passed to block 94 to determine whether the TRACK_IT value for the target exceeds a threshold value that is optionally configurable by the user. The threshold value is set to a level that limits the number of documents that are monitored to those that are visited with at least a minimum frequency. If the threshold is not exceeded, control is diverted to block 100 to display the definition in a visited format. If, however, the threshold is exceeded, control passes to block 96 to execute a trigger function for the target document to determine whether the notification criteria has been met, and consequently, whether the targeted document has been updated since it was last visited. If the document has not been updated, block 98 passes control to block 100 to display the definition in a visited format. If, however, the trigger has fired as a result of the target document being updated, control is passed to block 102 to display the link definition in an updated format.

In each circumstance, control is returned to block 84 to process the additional data in the document until all such data has been processed for the document. Once the document is fully rendered, control passes to block 104 to call the trigger data function for the current document, thereby storing information pertaining to the current contents of the document in the reference data for that document in the visited list.

Routine 80 generally operates to display link definitions in one of three formats. The first, normal, format typically refers to link definitions pointing to targets that have not been previously visited. The second, visited, format relates to documents that have been previously visited, but have not been updated according to the notification criteria set forth in the trigger function for the document. The third, updated, format relates to documents that have been previously visited and have been determined to have been updated since they were last visited.

Any number of mechanisms may be used to visually distinguish the various formats for a link definition. For example, different colors may be used to represent each link definition, in a similar manner to the different colors that are used to distinguish cached and non-cached documents with many conventional browser designs. Other manners of distinguishing each type of link definition may be used. For example, different text formatting (e.g., different fonts, attributes, styles, etc.) may be used for each link definition. Also, different icons may be disposed adjacent link definitions of one or more of the three types to distinguish the link definitions. The icons may include graphical information as well as alphanumeric information indicating the status of such link definitions. Moreover, as discussed in greater detail below, status information regarding visited links may be displayed in response to a user placing focus on such link definitions with a mouse pointer. Other modifications will be apparent to one skilled in the art.

As discussed above, in addition to maintaining a list of visited documents, a list of tracked documents may also be maintained consistent with the invention. Whereas the maintenance of a visited list is handled automatically by the browser during navigation by a user, the maintenance and usage of the tracked list is principally handled in response to specific user actions, with a few exceptions noted below. In general, a user utilizes the tracked list to maintain a number of links for which the user specifically wishes to monitor. This list may be used as the bookmark or favorites list for a browser. Alternatively, the tracked list may be implemented separately from a bookmark or favorites list.

One function required to implement a tracked list is that of displaying the list, e.g., in a pop-up window in the browser. As shown in FIG. 3, such an event is handled by block 56, which may be initiated in response to any number of user interface actions, e.g., a menu selection, toolbar button, etc.

Figure 7:
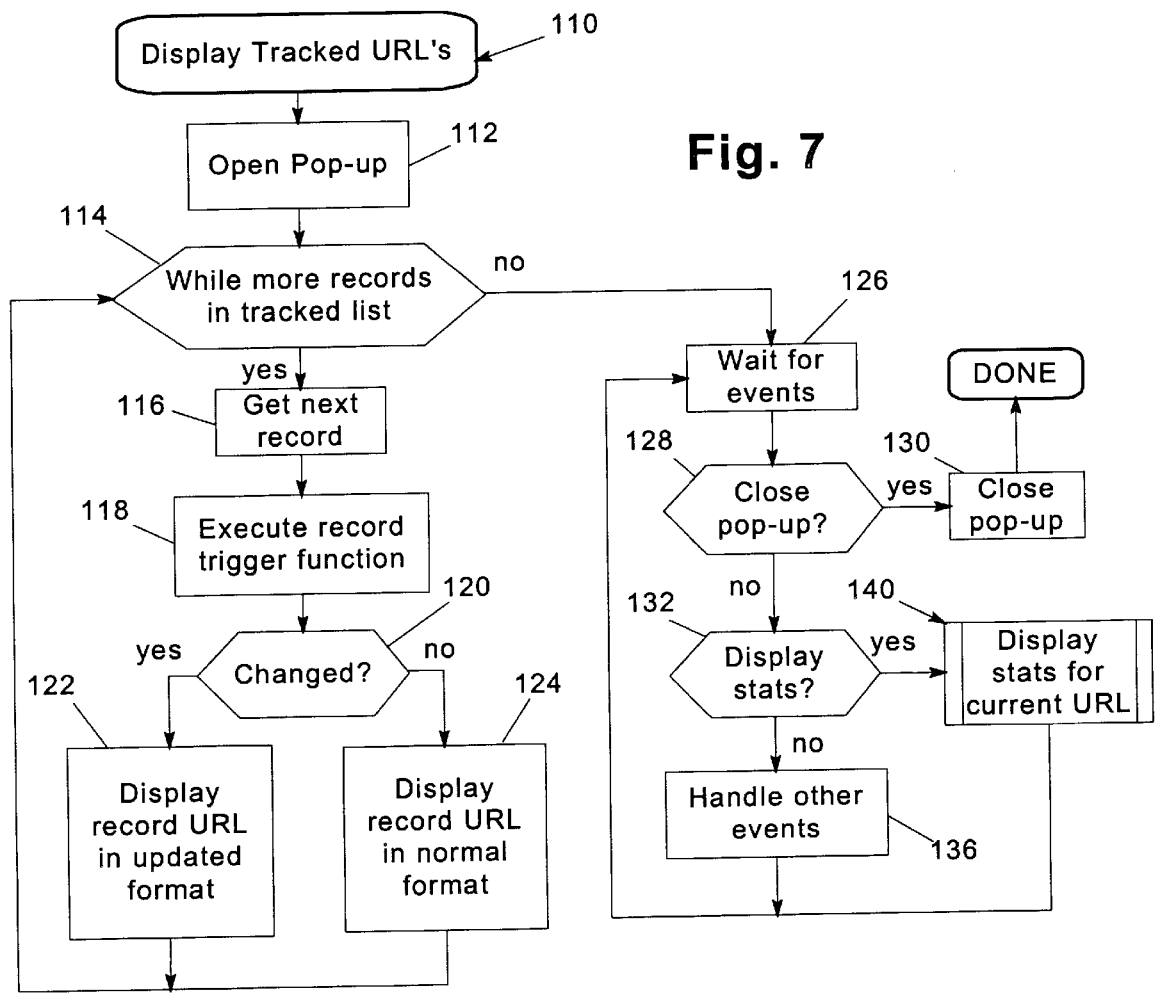
FIG. 7 is a flowchart illustrating the program flow of the display tracked URL's routine of FIG. 3.

Turning to FIG. 7, display tracked URL's routine 110 begins at block 112 by opening a pop-up window or other suitable graphic control to display the list of tracked locations. Next, in block 114 a while loop is initiated to analyze each record in a tracked list within which is stored information regarding the various locations to track.

Figure 8:
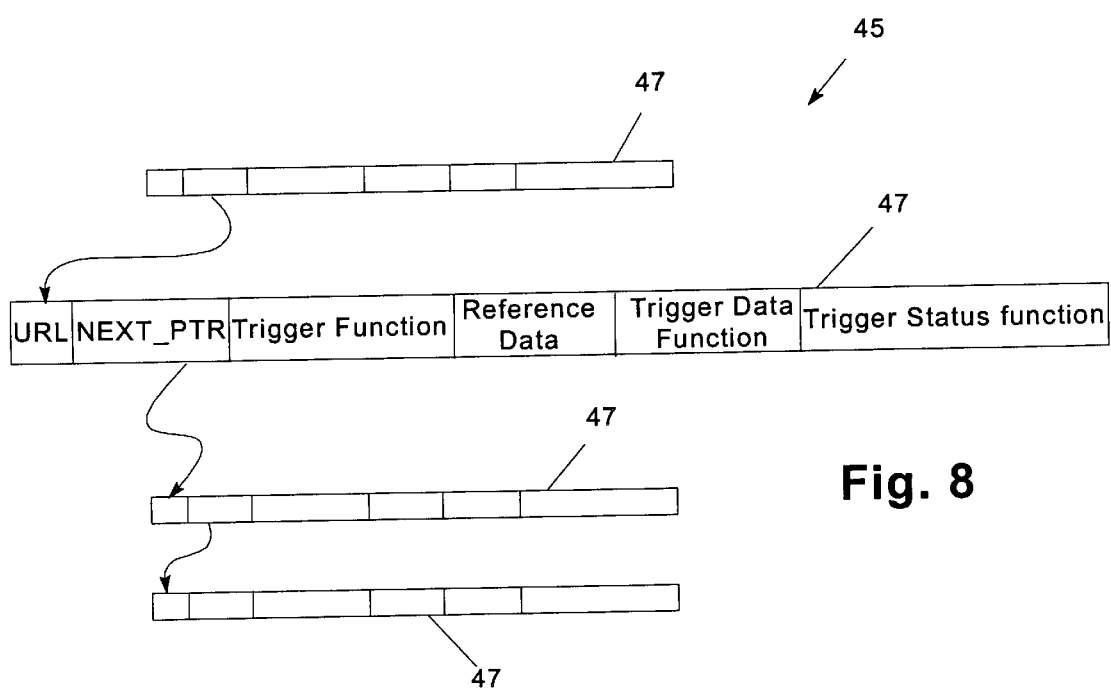
FIG. 8 is a block diagram of a tracked list consistent with the invention.

As shown in FIG. 8, a tracked list 45 includes a plurality of records 47 organized into a list data structure. In the alternative, other data structures may be utilized to represent the required information. Each record may be similarly configured to the records in visited list 40, including an identifier such as the URL of the location to be tracked, a NEXT_PTR pointer to the next record in the list, reference data that stores information regarding the contents of the document at the location the last time the location was checked, a trigger function that retrieves the trigger data for the current copy of the document at the location and determines whether the document was updated, and a trigger data function that stores such data in the reference data for the record. In addition, each record 47 also includes a trigger status function that is utilized to generate and return statistical information regarding the last detected change to a location (described in greater detail below). As with visited list 40, the program code for each trigger function may be stored directly in each record 42, or may be shared by more than one record.

Returning to FIG. 7, a while loop is initiated in block 114 to analyze each record in the tracked list 45. As long as additional records need to be processed, control passes to block 116 to retrieve the next record. Next, block 118 executes the trigger function stored for that record. If the record has changed, block 120 passes control to block 122 to display the URL for the record in an updated format. If not, block 124 is executed to display the URL for the record in a normal format. The normal and updated formats are selected to visually identify to a user which document locations being tracked have been updated. For example, any of the display formats discussed above for the visited list may be utilized in the tracked list as well.

Once all of the records in the tracked list have been processed, block 114 passes control to block 126 to wait for events relating to the tracked list pop-up window. Any number of events may be handled for the pop-up window in this manner. For example, as shown at block 128, an event may be generated to close the pop-up window, e.g., as a result of a user clicking on a closed button, selecting an exit function from a pull-down window, or inputting a unique keystroke combination. If a close pop-up event is detected at block 128, control is passed to block 130 to close the pop-up in a manner known in the art, and thereby terminate the routine.

Another event handled by routine 110 is that of displaying statistics, which is detected at block 132. If a request to display statistics regarding a particular location is detected, block 132 passes control to block 140 to display the statistics for the requested location. This may be useful for enabling a user to determine whether or not it would be advantageous to select the document.

The display of statistics may be in response to, for example, selecting a pop-up menu selection after highlighting a desired location, or simply by placing the mouse pointer over a desired location such that the location is focused on the computer display. Other user interactions may also trigger such an event. It should also be appreciated that a status display function may also be provided for documents in the visited list, such that a user may retrieve statistics for links displayed in a hypertext document.

It should be appreciated that other events may be handled in block 136 in a manner well known in the art. For example, various list maintenance events may be handled in block 136, e.g., removing or editing existing records, copying records, editing trigger functions, etc. Moreover, any document in the tracked list may be selected to open the document in the current browser window or a new browser window. In addition, various functions not relevant to an understanding of the invention, e.g., moving and resizing the window, may also be handled consistent with the invention.

Figure 9:
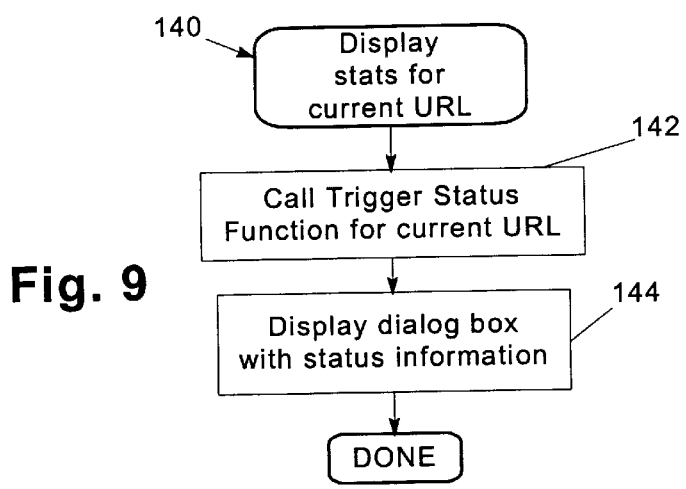
FIG. 9 is a flowchart illustrating the display stats for current URL routine of FIG. 7.

FIG. 9 illustrates routine 140 in greater detail. Routine 140 begins at block 142 by calling the trigger status function stored in the record for the selected document. The trigger status function generally returns information regarding the last detected change to a location. Once this information is obtained, block 144 is executed to display a dialog box containing such status information. Other user interface mechanisms, e.g., further pop-up windows and the like may also be used in the alternative. The trigger status function may return, for example, a text string that is displayed in the dialog box for notification to the user.

Figure 10:
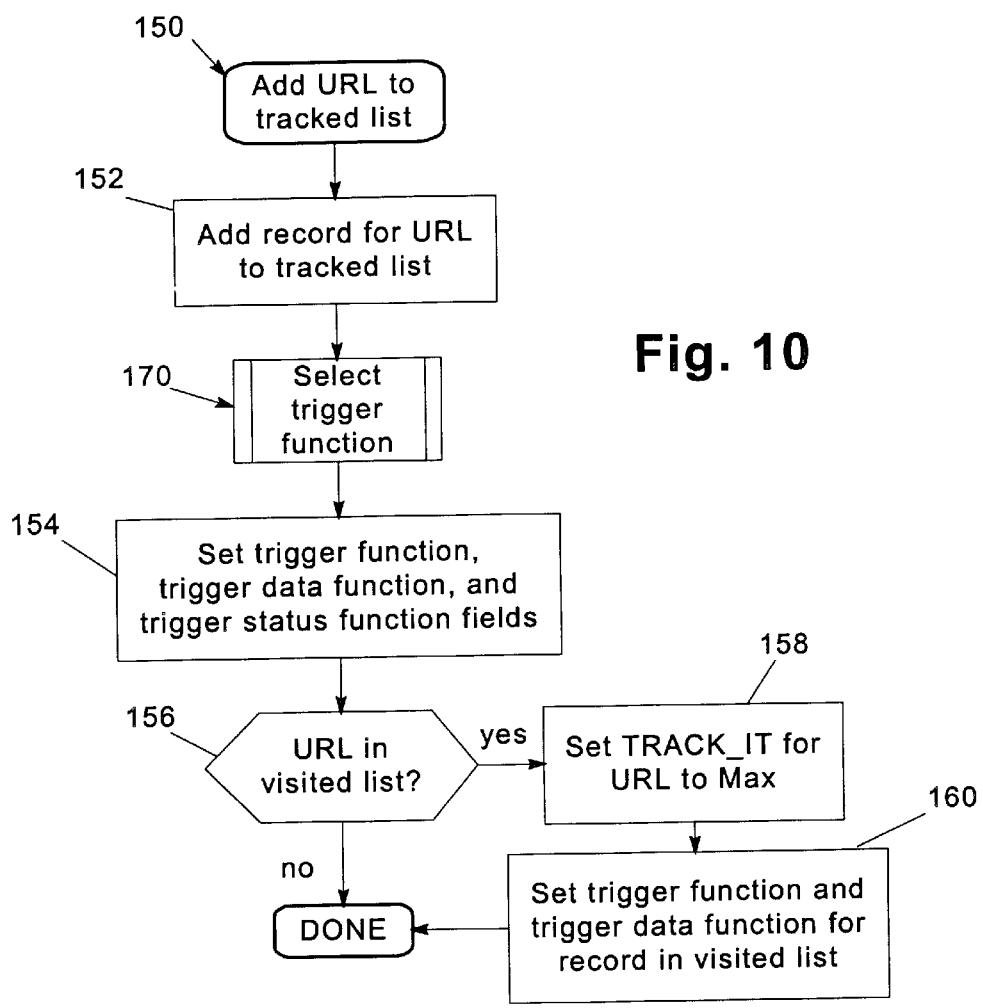
FIG. 10 is a flowchart illustrating the program flow of the add URL to tracked list routine of FIG. 3.
Figure 23:
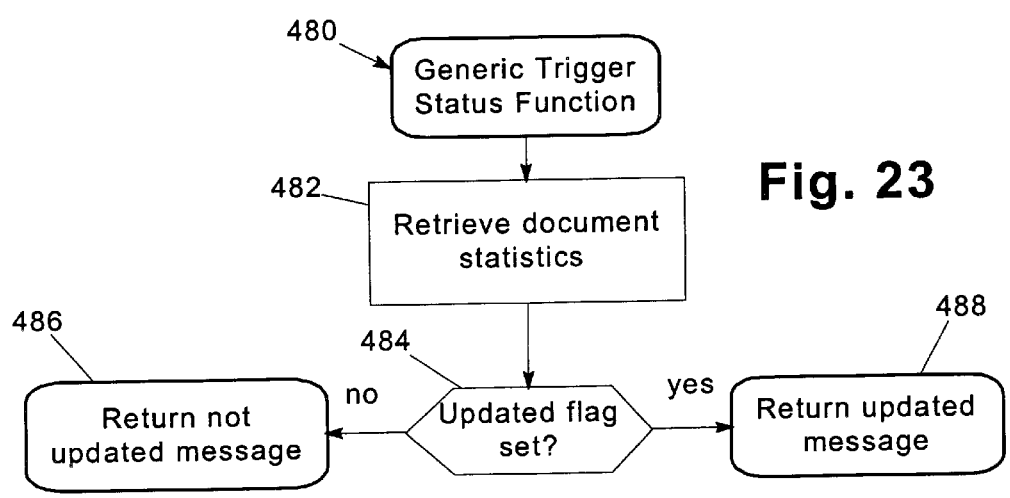
FIG. 23 is a flowchart illustrating the program flow of a generic trigger status function consistent with the invention.

Returning to FIG. 3, another tracked list event that is handled by routine 50 is that of adding a URL to the tracked list. This event is detected at block 58 and handled by routine 150, which is illustrated in greater detail in FIG. 10. First, block 152 is executed to add a record for the URL to the tracked list. Next, a select trigger function routine 170 is executed to permit a user to select and configure one of several types of trigger functions. Next, in block 154, the trigger function, trigger data function and trigger status function fields of the record are updated in response to the information returned from block 170. Next, in block 156, it is determined whether the URL being tracked is also on the visited list. If not, the routine terminates. If, however, the URL is found in the visited list, the TRACK_IT value for the URL is set to a maximum value in block 158 such that the location will be tracked by the automated visited list function. Next, in block 160, the trigger function and trigger data function for the corresponding record in the visited list for the tracked URL are updated with the same trigger and trigger data functions stored in the tracked list. In this manner, both the visited and tracked lists are synchronized with the same user selections.

Figure 11:
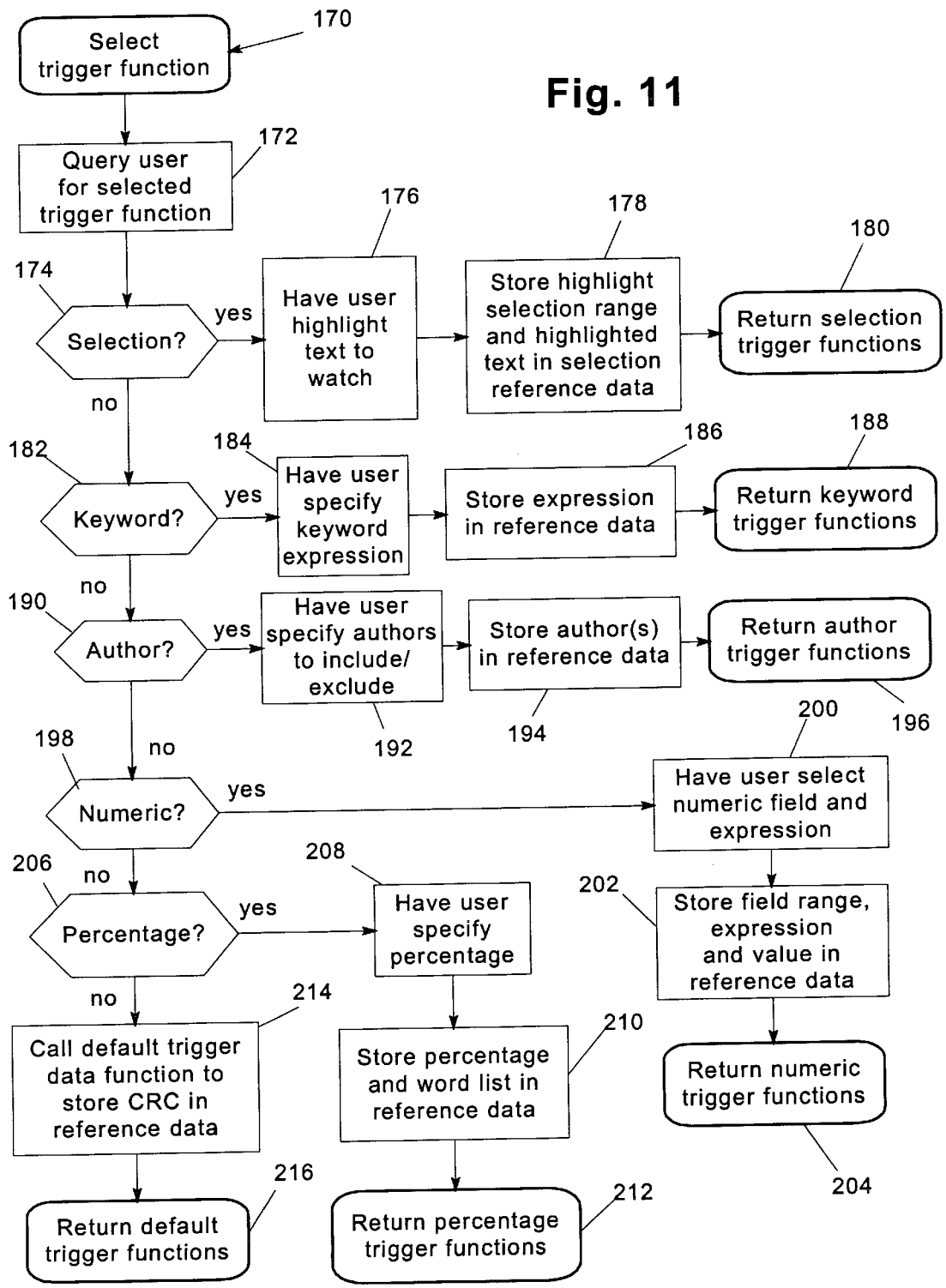
FIG. 11 is a flowchart illustrating the program flow of the select trigger function routine of FIG. 10.

Routine 170 is illustrated in greater detail in FIG. 11. First, in block 172, a user is queried to select a trigger function. Several types of trigger functions are typically available to a user consistent with the invention. The user may be queried for a selected trigger function using any known user interface mechanisms, e.g., pull-down menus, check boxes, radio buttons, list boxes, etc.

A "selection" trigger function is handled at block 174. Generally, the trigger function analyzes only a highlighted section of a document for updates. Accordingly, in block 176, a user is requested to highlight the section to watch on the current document. This may be performed, for example, using any known user interface mechanisms, e.g., dragging a mouse from the start to the end of a selection while depressing a mouse button, clicking on the start and end positions of a selection, etc. It should be appreciated that only one section may be highlighted, or in the alternative, multiple sections may be highlighted, whereby multiple sets of start and end positions would be defined. A highlighted section may also define a region to exclude from analysis, e.g., if it is determined that it is not necessary to be notified of changes in such a section.

A section may also be defined by a user based upon a specific content delimiter within a document, whereby a user may define a characteristic of the document contents, e.g., a specific text style, text type or text format. Moreover, contents delimited by specific tags, e.g., different HTML tags, may be included or excluded from analysis. Other types of multimedia objects, e.g., tables, images, videos, sounds, executable programs, scripts, etc. may also include object definitions that delimit sections to be included or excluded from analysis. One specific application of this feature is that for documents that display the source code of a computer program, a user could specify that updates to the comments in the source code be excluded from the notification criteria for the document (e.g., by defining excluded sections delimited by the comment tokens in the document). Other manners of delimiting sections within a document may be used in the alternative.

Once a user has highlighted the content to watch, control passes to block 178 to store the selection range as well as the current contents within that selection in the reference data for that document. In the alternative, a checksum could be stored instead of the contents, so that a checksum calculation is performed only for the selection range. Next, in block 180, routine 170 returns a set of selection trigger functions, including a selection trigger function, a selection data trigger function and a selection trigger status function, each of which is tuned to monitor the selected range of the document. As discussed, block 180 may return the actual program code suitable for implementing the selection trigger functions. In the alternative, block 180 may return pointers to generic selection trigger functions, along with the parameter data necessary to tune such functions for use in monitoring the selected range of the document.

Another type of trigger function that may be utilized is a keyword trigger function that is selected by user at block 182. Generally, a keyword trigger function implements any known keyword search functions to determine whether a given search criteria entered by a user has been met. As will become apparent below, a keyword may include text, as well as other data such as tags, formatting codes or styles, multimedia objects, etc., consistent with the invention.

At block 184, a user is requested to specify a keyword expression to search for when determining whether a document has been updated. Any known search engines and techniques may be used, including various search languages such as boolean and natural search languages, among others. Furthermore, wild card searches may also be utilized consistent with the invention.

A search criteria may search for a specific text and/or may exclude specific text. Furthermore, a search criteria may be defined for certain styles within a document, whereby a user may search for a characteristic of such text, e.g., a specific style, type or format. Moreover, specific tags, e.g., different HTML tags, may be highlighted or excluded from analysis. Other types of multimedia objects, e.g., tables, images, videos, sounds, executable programs, scripts, etc. may also be searched via a keyword-type search (e.g., for images, searching for a particular color). It should be appreciated that various search engines and searching techniques that are well known in the art may be used consistent with the invention.

Next, once a user has specified a keyword expression, block 186 stores that expression in the reference data for the document. Next, in block 188, a set of keyword trigger functions are returned in the manner discussed above.

Another type of trigger function is an author-based trigger function handled at block 190. With this type of trigger function, notification of updates is limited to updates performed only by specific users. This may permit, for example, a user to be notified whenever a document is updated by a specific user. This may also permit a user to exclude updates by other specific users, e.g., if it is known that a specific user makes minor formatting changes to documents, rather than the content thereof.

Information regarding users who have updated specific documents may be stored, for example, in tags within such documents or within the text of a given document. This feature may be particularly useful in intranet environments where only a limited number of users have access to a given document, and thus a limited number of users need to be tracked.

In block 192, a user is requested to specify the author(s) to include or exclude. This function may be implemented in much the same manner as the inputting of a keyword expression, although in some environments such as intranet applications, the user may be able to select specific users to include or exclude from update notification based upon drop-down lists containing all of the available users on a network.

Once the authors to include and/or exclude are inputted, block 194 stores those authors in the reference data for the document. Then, in block 196, a set of author trigger functions are returned for storage within the list record for the document.

Another type of trigger function is a numeric trigger function, handled at block 198. This type of trigger function, which may be implemented in much the same manner as a selection trigger function, monitors numerical data to determine whether such data meets an expression selected by a user. For example, a user may be permitted to select a threshold value for a given piece of data such that the user will be notified whenever that data crosses such a threshold. For example, this function might be utilized to monitor the price of a stock such that a user may be notified when the price of the stock falls outside of a predetermined range.

A numeric trigger function is handled first at block 200 by requesting that the user select a numeric field and expression specifying when updates should be triggered for the numeric field. Selection of a numeric field may occur in the same manner as a selection trigger function, e.g., through mouse drag operations, specifying content delimiters, etc. Other manners of selecting a numeric field may also be used in the alternative. Selection of a numeric expression may be limited to a minimum and maximum thresholds or, in the alternative, may include more complex expressions, e.g., various mathematical functions and the like. For example, it may be possible for a user to select multiple numeric fields and be notified whenever standard deviation of the data points specified in the fields fall outside of a predetermined range. Generally, any number of numeric values and numeric expressions may be used consistent with the invention.

Once the numeric field and expression information has been input by user, control passes to block 202 to store the field range, the expression, and the current value for the document in the reference data for the document. Next, in block 204, a set of numeric trigger functions are returned from routine 170.

Yet another type of trigger function is a percentage trigger function, handled at block 206. With a percentage trigger function, the relative amount of a document that changes may be monitored such that minor changes falling below a given threshold do not trigger notification of an update to the document. Accordingly, in block 208, a user is requested to specify a minimum update threshold as a percentage value of the document.

Next, in block 210, the percentage for the document is stored in the reference data for the document. In addition, a word list is generated from the current copy of the document (in the manner discussed below) and stored in the reference data. Next, in block 212, a set of percentage trigger functions are returned from routine 170.

An additional type of trigger function, which is deemed the default trigger function in the embodiment described herein, may be handled at block 214. With the default trigger function determination as to whether or not a document has been updated is performed by maintaining a checksum value for the document and comparing that value to a previously calculated checksum for the document. For example, a cyclic redundancy code (CRC) checksum may be calculated for a document in a manner known in the art. Accordingly, in block 214, the default trigger data function is called for the document to store in the reference data for that document the checksum for the current document (discussed in greater detail below). The default trigger data function calculates the checksum and updates the reference data for the document with this value. Once this process is completed, block 216 then returns the default set of trigger functions for storage in the list record for the document. In the alternative, it should be appreciated that block 216 may be omitted if the default trigger functions are initially set in a list record upon its creation. It should also be appreciated that other default functions may be used in the alternative. For example, a time stamp may be stored in a document, e.g., in a HTML tag, whereby an update would be indicated by a more current time stamp in the document than that stored in the reference data therefor. In the alternative, it may be possible to implement a quick time stamp function on the server side of a network such that a client/browser may request that a time stamp rather than the entire contents of a document, be returned by the server. It should be appreciated that the quick time stamp function could significantly speed update detection as well as reduce the bandwidth between the client and the server.

Other types of trigger functions may be used consistent with the invention. Moreover, it should be appreciated that multiple trigger functions may be stored for a given document such that multiple notification criteria must be met prior to notification of an update to the document. Alternatively, multiple notification criteria may be provided such that an update is notified whenever any notification criteria is met. Other modifications will be apparent to one of ordinary skill in the art.

Figure 12:
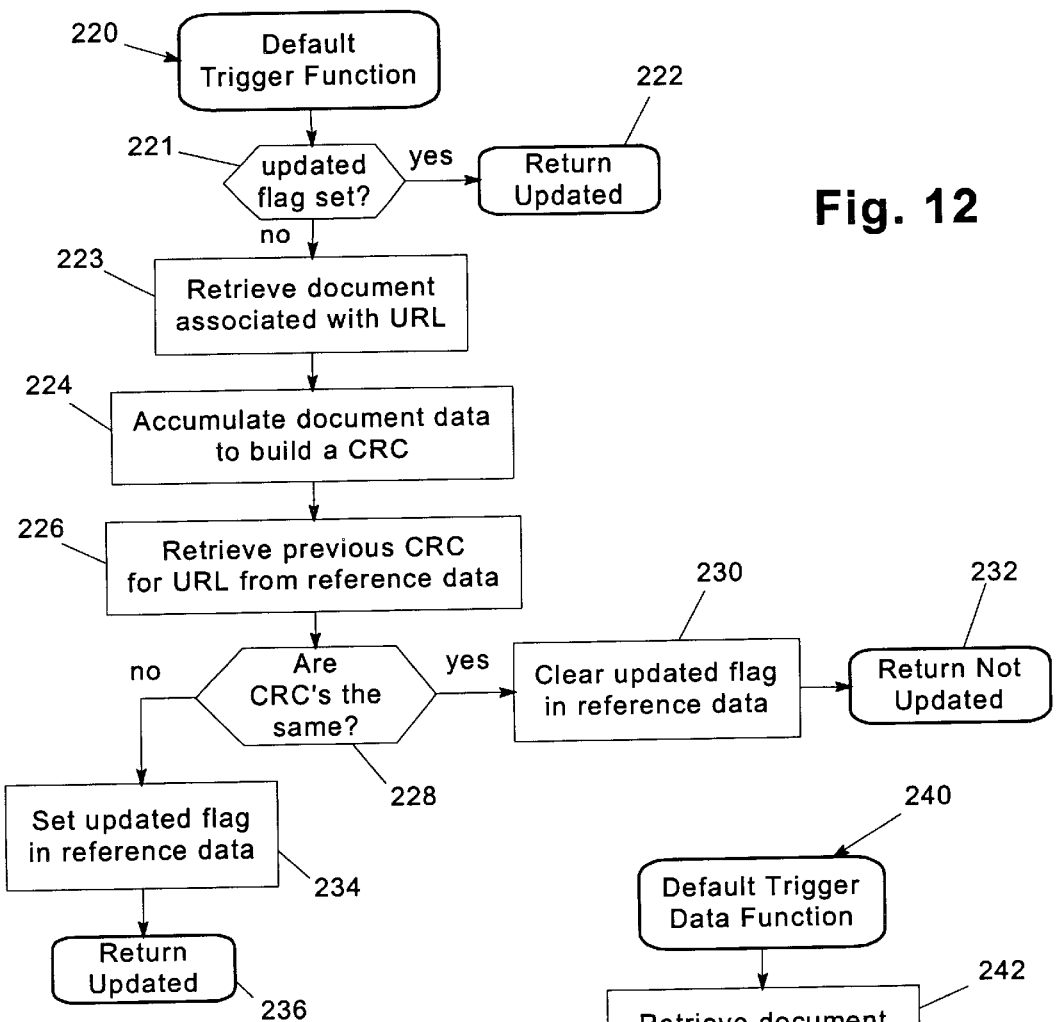
FIG. 12 is a flowchart illustrating the program flow of a default trigger function consistent with the invention.

One suitable implementation of a default trigger function is illustrated by routine 220 in FIG. 12. In general, determination of whether a document has been updated is indicated by an updated flag stored in the reference data for the document. Accordingly, in block 221, routine 220 first determines whether the updated flag has already been set, e.g., due to an earlier execution of the default trigger function.

For example, it may be desirable to execute trigger functions as background processes in addition to execution of such functions during display of a document and/or display of the tracked list as discussed above. By executing the trigger functions in the background, retrieval of each and every document and linked to a currently displayed document, or each and every document in a tracked list, may not always be necessary, thereby greatly enhancing the performance of the browser in implementing the various functions consistent with the invention.

If the updated flag is set, block 221 returns an updated status to its calling routine at block 222. If, however, the updated flag has not been set, the document associated with the URL passed to the trigger function is retrieved in block 223. Next, in block 224, the document data is accumulated to build a CRC checksum. In block 226, the previous checksum stored in the reference data for the document is retrieved, and in block 228, the two checksums are compared. If the two checksums are the same, block 228 passes control to block 230 to clear the updated flag in the reference data, then to block 232 to return a "not updated" status to the calling routine. If, however, the checksums are not the same, the document has been updated, and accordingly, control is passed to block 234 to set the updated flag in the reference data and to return an "updated" status to the calling routine in block 236.

Figure 13:
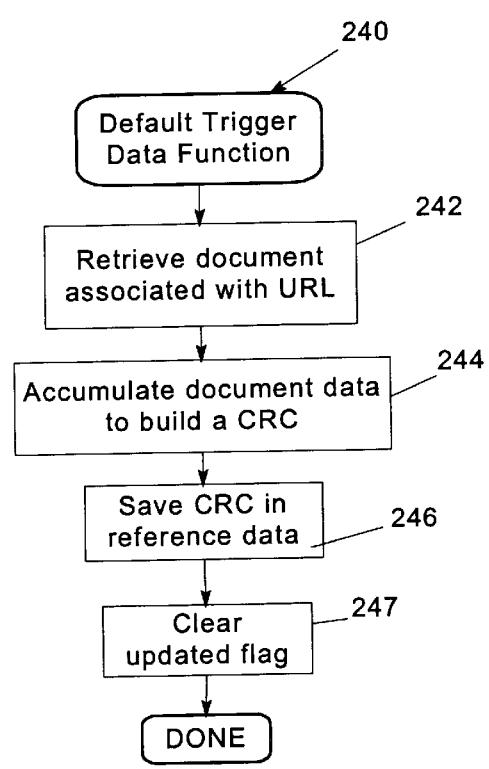
FIG. 13 is a flowchart illustrating the program flow of a default trigger data function consistent with the invention.

A suitable implementation of a default trigger data function is illustrated by routine 240 in FIG. 13. Routine 240 begins at block 242 by retrieving the document associated with the URL passed to the function. Next, in block 244, the document data is accumulated to build a CRC checksum. Next, in block 246, the CRC checksum is stored in the reference data for document, and in block 247, the updated flag for the document is cleared to indicate that the current (non-updated) contents are stored in the reference data therefor. Routine 240 is then complete.

Figure 14:
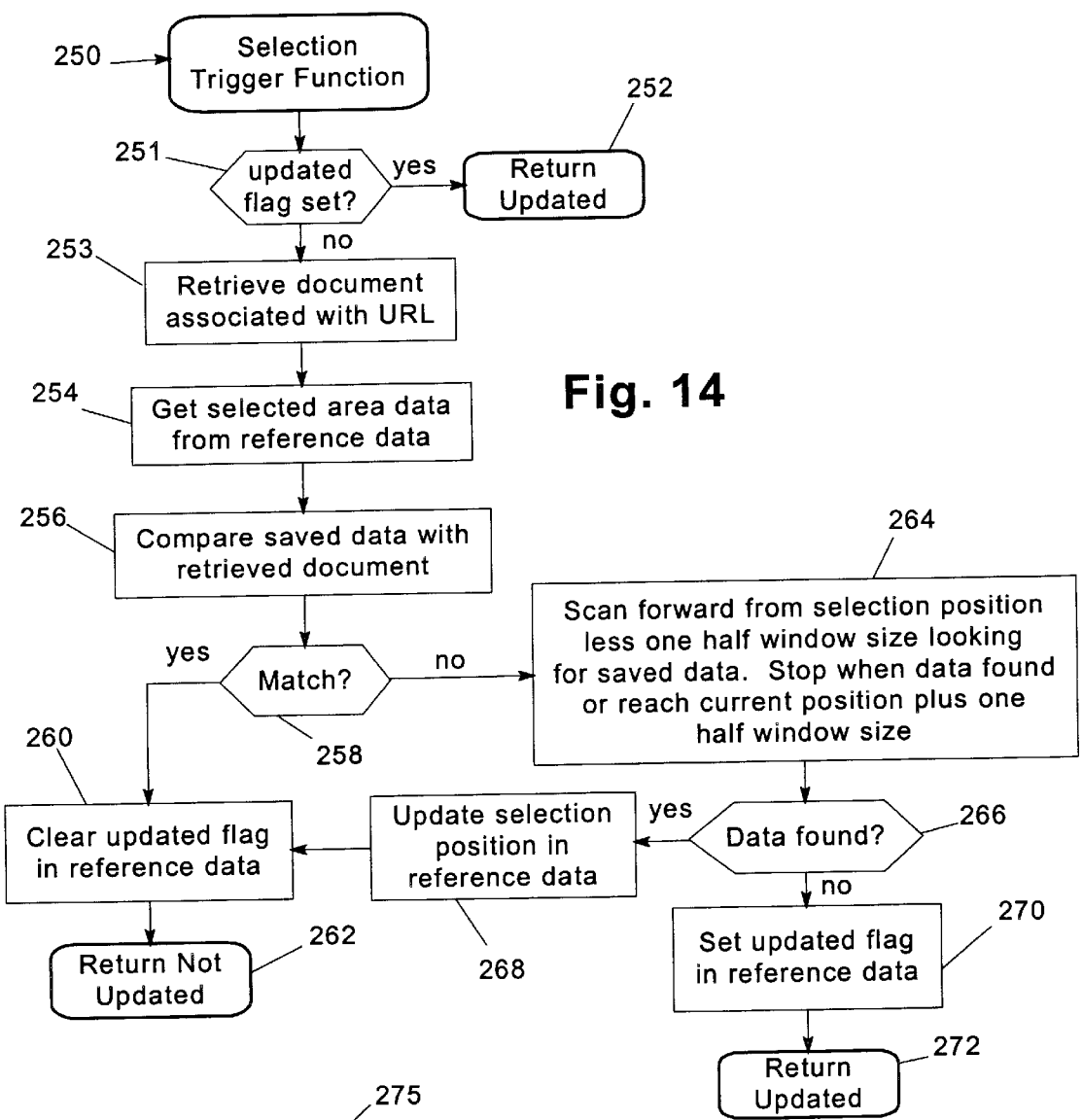
FIG. 14 is a flowchart illustrating the program flow of a selection trigger function consistent with the invention.

A suitable selection trigger function is illustrated by routine 250 in FIG. 14. Routine 250 begins at block 251 by determining whether the updated flag has been set for the document. If so, an "updated" status is returned in block 252. If, however, the updated flag is not set, block 253 is executed to retrieve the document associated with the URL passed to the function. Next, in block 254, the contents of the selected area specified in the trigger function are retrieved from the reference data for the document.

Next, in block 256, the saved data from the reference data is compared with the corresponding contents of the retrieved document. The information in the retrieved document that is compared with the saved data is determined by retrieving a selection position and range from the reference data stored for the document. For example, one or more sets of start and end positions in the document may be stored in the reference data to indicate the selection range selected by a user. The determination of whether the saved data matches the corresponding information in the retrieved document is performed typically by directly comparing the retrieved and saved contents, or in the alternative, by performing a checksum calculation on the specified range of the retrieved document and comparing the value to a value stored in the reference data.

If the saved data matches the corresponding information in the retrieved document, block 258 passes control to block 260 to clear the updated flag in the reference data. Routine 250 then terminates by returning a "not updated" status in block 262.

Returning to block 258, if the saved data does not match the corresponding contents in the retrieved document, control is passed to block 264 to scan through a window of predetermined size that is centered on the selection position stored in the reference data for the document. It should be appreciated that in many circumstances the data outside of a selected range may change and therefore modify the starting position of the range being monitored. Accordingly, it is desirable to scan through a window surrounding the selected position stored in the reference data for the document to ensure that an updated status is not returned if the contents of the selected range have merely been shifted forward or backward in the document.

Accordingly, in block 264, a starting position from which to scan is set to be a distance of one-half the predetermined window size back from the selection position stored in the reference data for the document. Block 264 then scans forward looking for the saved data. On the other hand, if the saved data is found prior to reaching the end of the window, the data is determined to have been found.

Accordingly, in block 266, if the data is found within the window, control is passed to block 268 to update the position of the selection in the reference data. This ensures that subsequent update analysis searches from the last known position of the selection. Control is then passed to block 260 to clear the updated flag and return the "not updated" status for the document.

Returning to block 266, if the data is not found, control is passed to block 270 to set the updated flag in the reference data, and then pass control to block 272 to return an "updated" status for the document. In either event, execution of the trigger function is complete.

Figure 15:
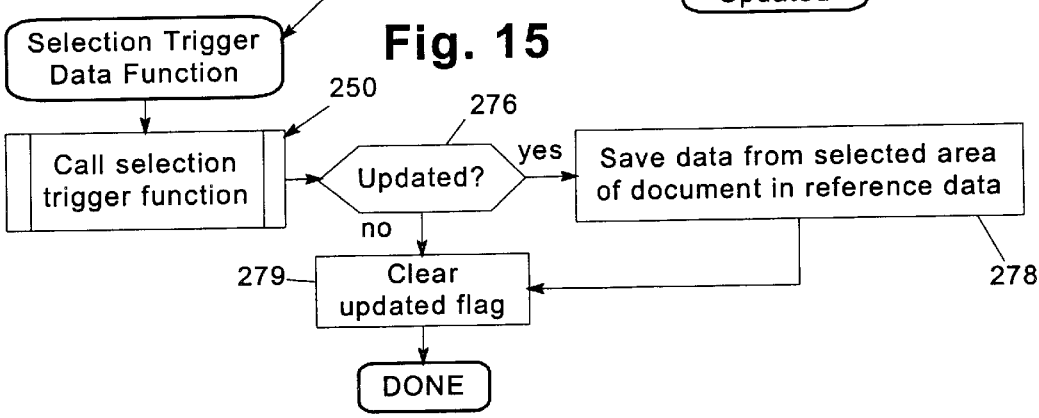
FIG. 15 is a flowchart illustrating the program flow of a selection trigger data function consistent with the invention.

A suitable selection trigger data function is illustrated by routine 275 in FIG. 15. Routine 275 begins by calling the selection trigger function 250 (FIG. 14) to determine whether the document has been updated, as well as to shift the selection position for the data if necessary. Next, in block 276, it is determined whether the updated status has been returned. If so, the data from the selected area of the document is stored in the reference data at block 278. Control is then passed to block 279 to clear the updated flag for the document, prior to terminating the routine. If the document has not been updated, block 276 passes control directly to block 279 to clear the updated flag and terminate the routine.

Figure 16:
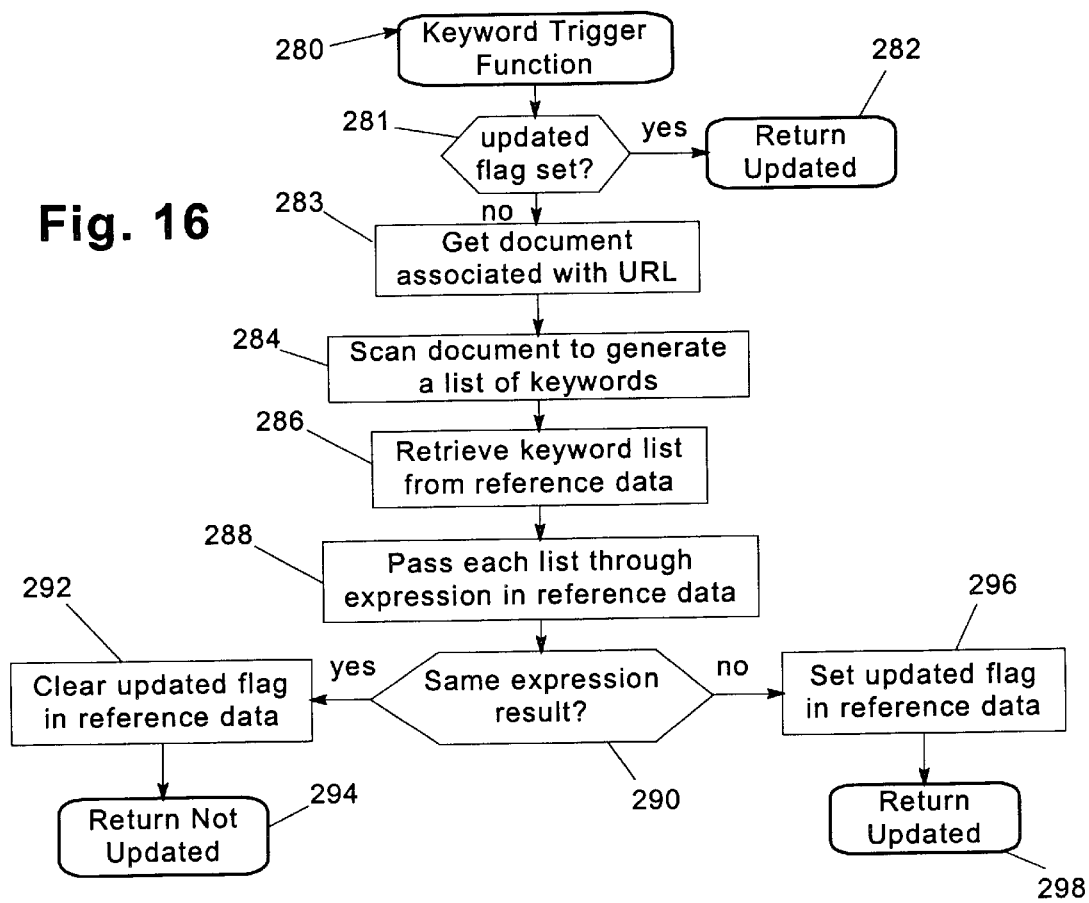
FIG. 16 is a flowchart illustrating the program flow of a keyword trigger function consistent with the invention.

A suitable keyword trigger function is illustrated by routine 280 in FIG. 16. Routine 280 generally operates by comparing a list of keywords stored in the reference data to a list of keywords generated from the current copy of the document, and optionally passing each list through a search expression specified in the reference data. Routine 280 first checks in block 281 whether the updated flag for the document is set, and if so, passes control to block 282 to return an updated status to the calling routine. If not, control is passed to block 283 to retrieve the document associated with the document URL. Next, block 284 scans the document to generate a list of keywords. Each word in the document may be inserted into the list, or more typically, only words that are specified in the keyword search criteria for the document are analyzed. Next, block 286 retrieves the keyword list stored in the reference data for the document.

Next, block 288 passes each list through the search expression (if any) stored in the reference data. For example, a boolean search expression may be specified by a user, e.g., wherein one or more keywords from the keyword list are AND'ed or OR'ed together in a predetermined manner. In the alternative, a simple default AND or OR function may be applied to all of the keywords in the list, so that no separate keyword expression is supplied in the reference data.

Block 290 next determines whether the same expression result occurs with each list of keywords—that is, whether both expression results are TRUE or both expressions are FALSE. If the expression results are the same, it is assumed that the document has not been updated, so control passes to block 292 to clear the updated flag therefor and return a "not updated" status in block 294. If the expression results are different, it is assumed that the document has been updated, so control passes to block 296 to set the updated flag and return an "updated" status in block 298. Routine 280 is then complete.

Figure 17:
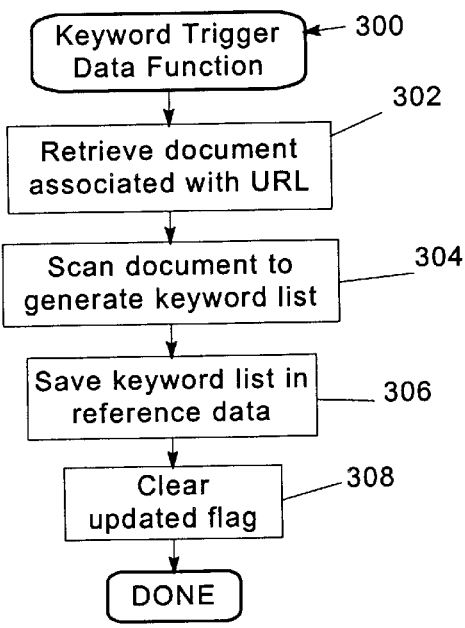
FIG. 17 is a flowchart illustrating the program flow of a keyword trigger data function consistent with the invention.

A suitable keyword trigger data function is illustrated by routine 300 in FIG. 17, where the document associated with the URL for the record is retrieved in block 302 and scanned in block 304 to generate a list of keywords—either all words in the document or a limited set of words specified by the search criteria for the trigger function. Next, the keyword list is stored in block 308 and the updated flag is cleared in block 308 to indicate that the current contents of the document are now stored in the reference data. Routine 300 is then complete.

Figure 18:
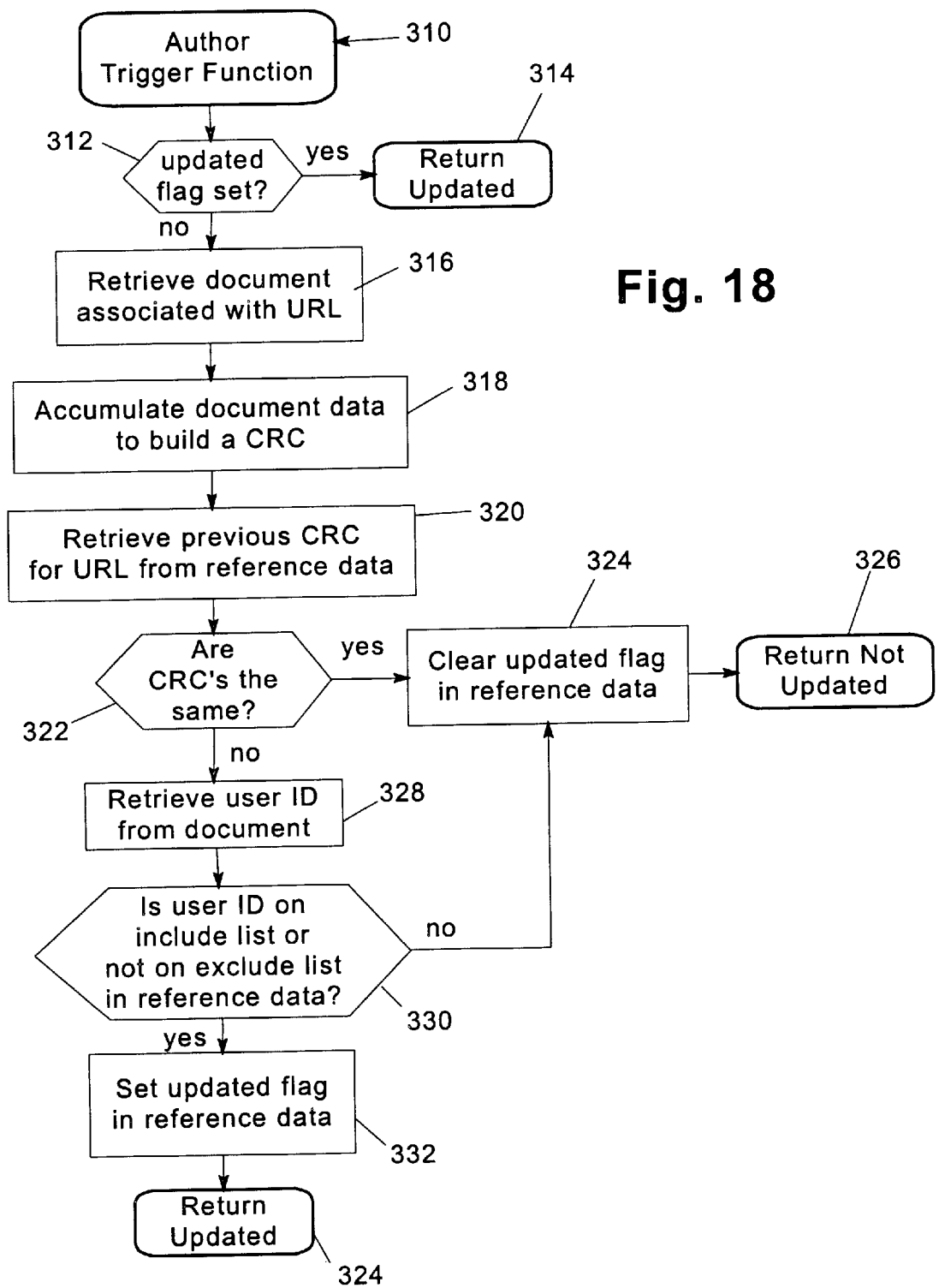
FIG. 18 is a flowchart illustrating the program flow of an author trigger function consistent with the invention.

A suitable author trigger function is illustrated by routine 310 in FIG. 18. Routine 310 utilizes a checksum notification criteria to determine whether a document has been updated, similar to default trigger function routine 220 of FIG. 12. However, in addition, routine 310 references either an "include" list of authors to monitor, or an "exclude" list of authors to explicitly exclude from being monitored. As a result, only updates by specific authors will trigger notification of an update.

Routine 310 first checks in block 312 whether the updated flag for the document is set, and if so, passes control to block 314 to return an updated status to the calling routine. If not, control is passed to block 316 to retrieve the document associated with the document URL. Next, block 318 accumulates the document data to build a CRC checksum for the current copy of the document, and block 320 retrieves the previous CRC checksum from the reference data. Next, block 322 determines whether the checksums are the same, and if so, clears the updated flag in the reference data in block 324 and returns a "not updated" status in block 326.

If not, control is passed to block 328 to retrieve the user ID from the current copy of the document. The user ID identifier indicates the last user to update the document, and may be found in the document text, or more typically, in a specific tagged field in the document. If the user ID for the document is found on an "include" list in the reference data, or is not found on an "exclude" list in the reference data block 330 passes control to block 332 to set the updated flag in the reference data and return an "updated" status in block 324. If the user ID is not on the "include" list or is on the "exclude" list, block 330 instead passes control to block 324 to clear the updated flag and return the "not updated" status in block 326. Routine 310 is then complete.

For the author trigger data function, the default trigger data function may be utilized. The authors to include and/or exclude are stored in the reference data during selection of the trigger function, and need not be modified thereafter in the trigger data function.

Figure 19:
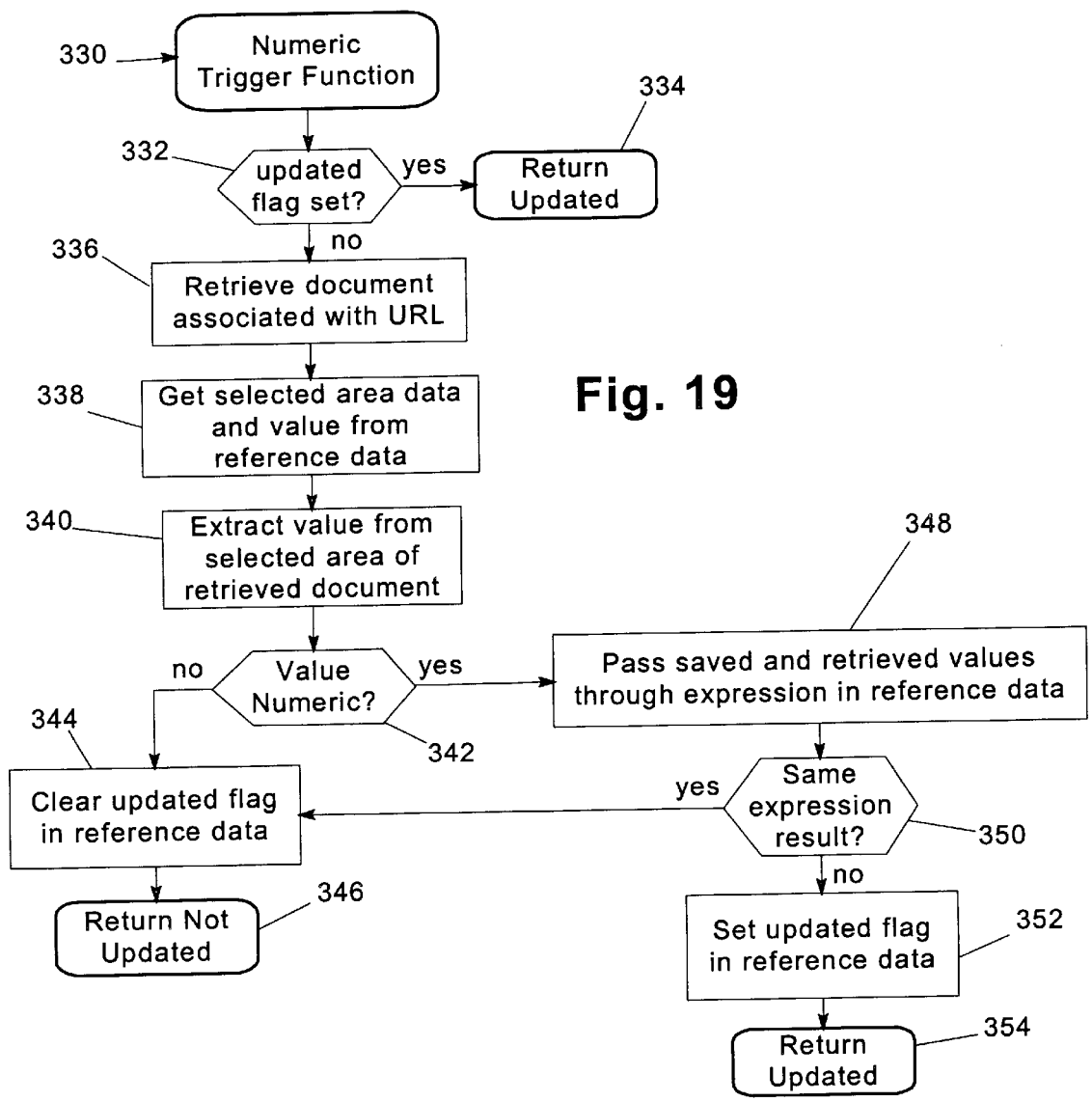
FIG. 19 is a flowchart illustrating the program flow of a numeric trigger function consistent with the invention.

A suitable numeric trigger function is illustrated by routine 330 in FIG. 19. Routine 330 operates in a similar manner to the selection trigger function routine 250 of FIG. 14, except that a value stored in the selected area is compared to a numeric expression set by the user. The numeric expression may include a maximum and/or minimum threshold, or may include a more complex numerical formula or expression. An update notification is triggered whenever the result of the expression changes between a current and a past copy of a document.

Routine 330 begins at block 332 by determining whether the updated flag has been set for the document. If so, an "updated" status is returned in block 334. If, however, the updated flag is not set, block 336 is executed to retrieve the document associated with the URL passed to the function.

Next, in block 338, the contents of the selected area specified in the trigger function are retrieved from the reference data for the document, specifically the numeric value stored therein. Next, in block 340, the value (if any) stored in the selected area of the retrieved document is extracted from the document. Next, block 342 determines whether the retrieved value is numeric. If not, control is passed to block 344 to clear the updated flag in the reference data. Routine 330 then terminates by returning a "not updated" status in block 346.

If the value is numeric, block 348 is executed to pass the saved and retrieved values through the numeric expression stored in the reference data. If the same result is obtained, block 350 passes control to block 344 to clear the updated flag and return a "not updated" status in block 346. If a different result is obtained, block 352 sets the updated flag and an "updated" status is returned in block 354. Routine 330 is then complete.

Figure 20:
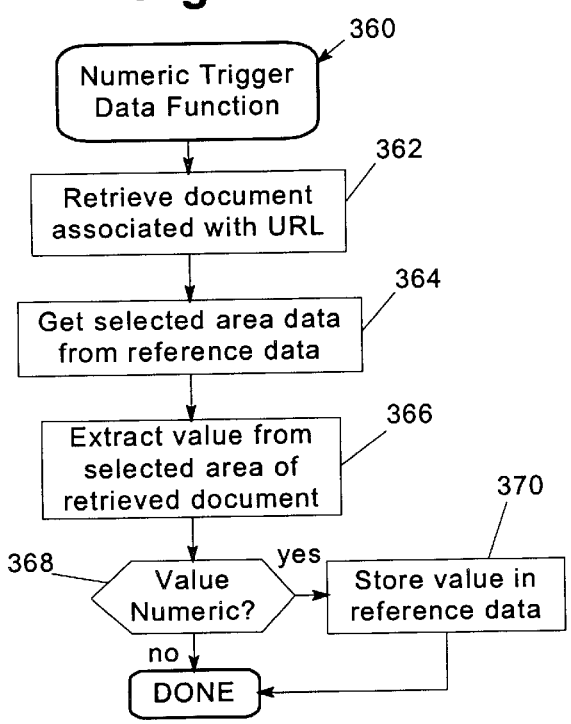
FIG. 20 is a flowchart illustrating the program flow of a numeric trigger data function consistent with the invention.

A suitable numeric trigger data function is illustrated by routine 360 in FIG. 20. Routine 360 begins in block 362 by retrieving the document associated with the URL for the record. Next, the selected area data is retrieved from the reference data in block 364, and the value from the selected area of the retrieved document is extracted in block 366. If the value is numeric, block 368 passes control to block 370 to store the value in the reference data, and routine 360 then terminates. If the value is not numeric, routine 360 terminates without storing a new value in the reference data.

Figure 21B:
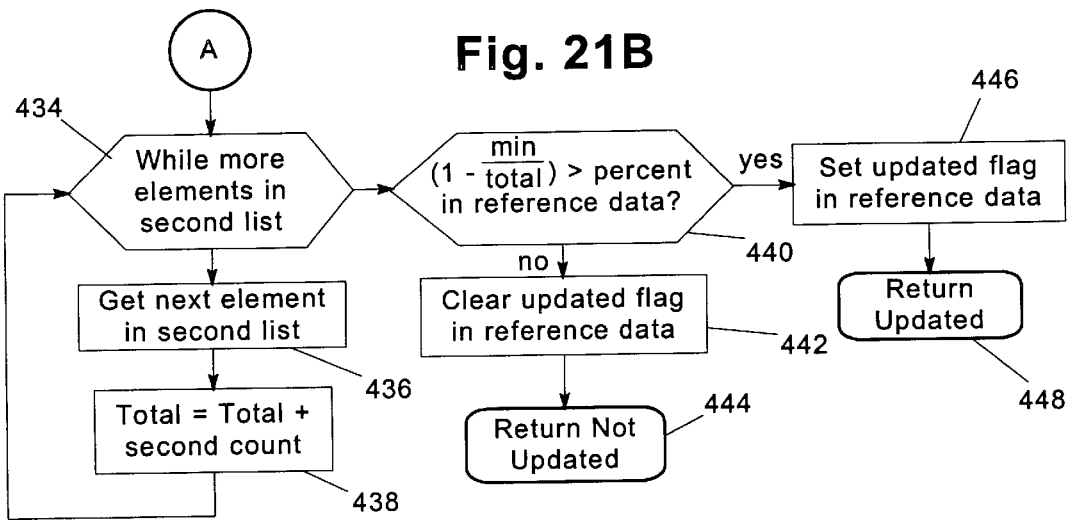
FIGS. 21A and 21B are flowcharts illustrating the program flow of a percentage trigger function consistent with the invention.
Figure 21A:
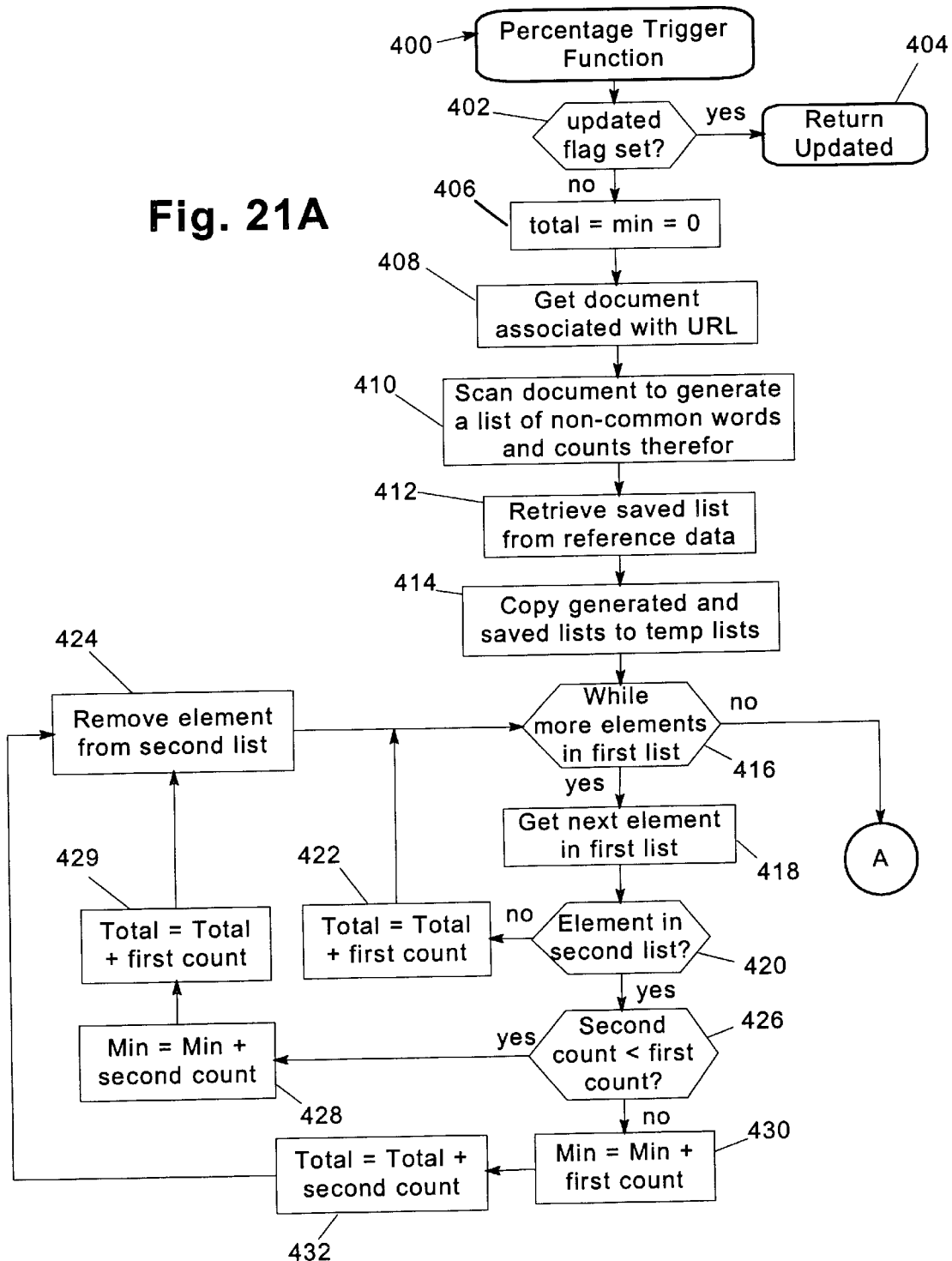

A suitable percentage trigger function is illustrated by routine 400 in FIGS. 21A and 21B. To minimize the amount of information that must be stored in the reference data for a document, routine 400 maintains a list of "non-common" words—that is, the text in a document excluding common words such as "it", "the", "and" and the like, and excluding tags and other formatting commands. In addition, counts of the non-common words are maintained. Consequently, the percentage of a document that has changed is estimated by determining the percentage of non-common words that have changed. In the alternative, the entire contents of a document may be stored in the reference data and compared to the current contents to determine the percentage change. Also, it may be possible to utilize a cached copy of a document for use in calculating the change. Other modifications will be apparent to one of ordinary skill in the art.

Routine 400 begins in block 402 by determining whether the updated flag has been set for the document. If so, an "updated" status is returned in block 404. If, however, the updated flag is not set, block 406 sets two variables, total and min, to zero, and block 408 retrieves the document associated with the URL passed to the function. The total variable maintains a running count of the possible duplicated material (non-common words) in the document, while the min variable maintains a running count of the actual duplicated material in the document. This is typically performed by storing in the total variable the maximum number of occurrences of each non-common word in either of the current and previous copies of the document, and summing in the min variable the number of duplicate occurrences of each non-common word in the current and previous copies of the document.

Next, in block 410, the document is scanned to generate a list of non-common words and the counts therefor in the retrieved document. In addition, the list of non-common words and their counts are retrieved from the data saved in the reference data for the document in block 412. Next, the generated and saved lists are copied to temporary lists for analysis, and a while loop is initiated in block 416 to scan through each element in a first list (which may be a copy of either of the saved and retrieved lists) and determine which elements having matching elements in a second list (the other of the saved and retrieved lists).

As long as more elements remain in the first list to analyze, block 416 passes control to block 418 to get the next element in the list. Next, block 420 determines whether the element is found in the second list. If it is not, control passes to block 422 to add the count for the element to the total variable. Control then returns to block 416 to process additional elements in the first list.

Returning to block 420 if the element is found in the second list, control passes to block 426 to determine whether the count for the element in the second list is less than that in the first list. If so, control passes to block 428 to add the count for the second list element to the min variable, then to block 429 to add the count for the first list element to the total variable. Control then passes to block 424 to remove the element from the second list. Returning to block 426, if the second count is not less than the first count, blocks 430 and 432 are executed to add the count for the first list element to the min variable and the count for the second list element to the total variable. Control then passes to block 424 to remove the element from the second list.

Once each element in the first list is processed, block 416 passes control to block 434 (FIG. 21B) to execute another while loop to process any remaining elements in the second list. For each such element, block 436 retrieves the element, and block 438 adds the count for that element to the total variable. Upon completion of the second while loop, the percentage of the document changed can be estimated by subtracting the ratio of min to total from one, and thus, block 440 determines whether that expression exceeds the percent threshold stored in the reference data to determine whether the document has been updated sufficiently to trigger a notification thereof. If the threshold is not exceeded, block 442 is executed to clear the updated flag and return a "not updated" status in block 444. If the threshold is exceeded, control passes to block 446 to set the updated flag and return an "updated" status in block 448. Routine 400 is then complete.

Figure 22:
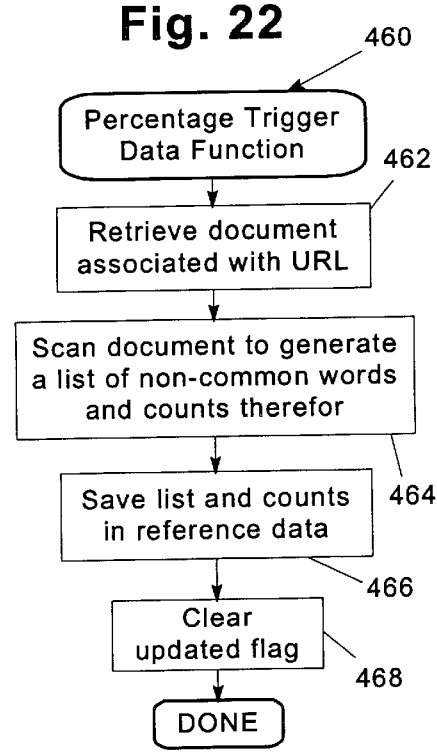
FIG. 22 is a flowchart illustrating the program flow of a percentage trigger data function consistent with the invention.

A suitable percentage trigger data function is illustrated by routine 460 in FIG. 22, which operates similar to keyword trigger data function routine 300 of FIG. 17. First, in blocks 462 and 464, the document associated with the URL for the record is retrieved and scanned to generate a list of non-common words and the counts (number of occurrences) therefor. Next, the list and counts are stored in block 466 and the updated flag is cleared in block 468 to indicate that the current contents of the document are now stored in the reference data. Routine 460 is then complete.

Figure 24:
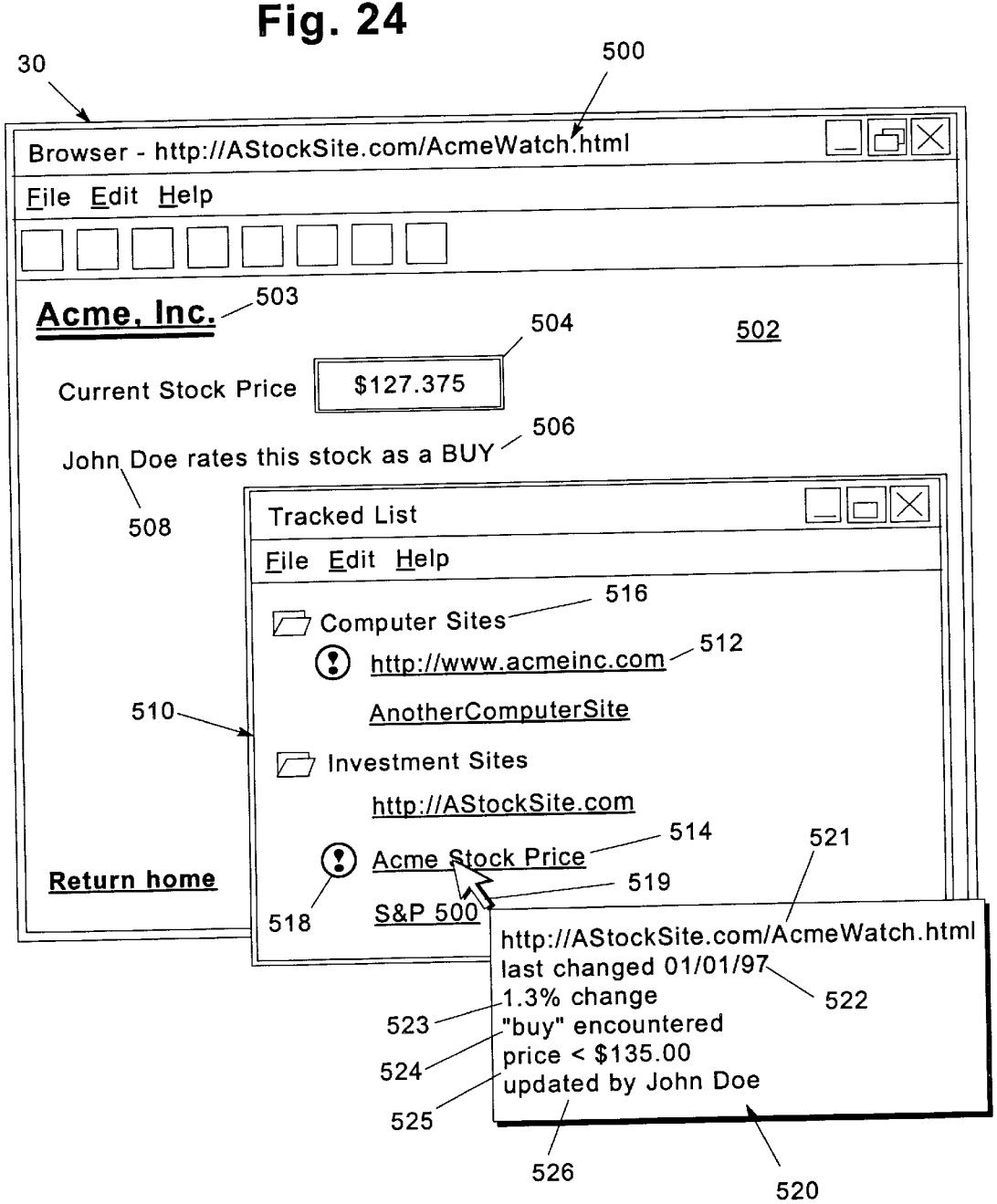
FIG. 24 is a block diagram illustrating a hypertext document displayed in a window with a tracked list displayed in a separate window.

A generic trigger status function suitable for use with each type of notification criteria is illustrated by routine 480 in FIG. 24. Generally, any trigger status function is called whenever statistics for a document are desired, e.g., as noted above in connection with routine 140 of FIG. 9. Routine 480 generally retrieves document statistics at block 482, determines whether the updated flag for the document is set in block 484, and depending on whether the flag is cleared or set, executes one of blocks 486 and 488 to return a "not updated" or "updated" message as appropriate.

The statistics that may be retrieved for a document may be varied for each type of trigger function selected for the document. For example, it may be desirable to retrieve information regarding the last user that has modified the document, e.g., through searching for an HTML tag within the document. In addition, it may be desirable to retrieve the last date that the document was updated, again as stored in a tag in the HTML document.

A trigger status function may return any status data as appropriate for the function. In one implementation, for example, the trigger status function may simply return a string that can be displayed directly in a dialog box or pop-up window.

For example, a "not updated" message may be formatted to indicate the last date the document was changed, e.g., by outputting a string such as "Document has not changed since [DATE]". Similarly, an "updated" message may indicate the last user and date pertaining to the update of the document, e.g., by returning a string such as "Document was last updated on [DATE] by [USERNAME]".

For various types of trigger functions, it may also be desirable to indicate additional data in the statistics that is specifically related to the type of trigger function.

For example, for the selection trigger function, it may be desirable to return a "not updated" message such as "Section from [START POSITION] to [END POSITION] in document has not changed". Similarly, for an "updated" message, it may be desirable to return a string such as "Section from [START POSITION] to [END POSITION] in document was changed on [DATE] by [USERNAME]". It may also be desirable to indicate in the return message the fact that the selection has been moved, including the amount of movement thereof.

For a keyword trigger function, it may be desirable to include in the return string for an "updated" message the specific keyword search criteria used to determine the update status for the document, e.g., "The search string [SEARCH CRITERIA] was found".

For a numeric trigger function, it may be desirable to include in the "updated" message the value being monitored and/or the results of the expression used to analyze the value. In addition, for the percentage trigger function, it may be desirable to indicate in the "updated" message and/or the "not updated" message the actual percentage of change in the document.

Other status information may be provided to a user consistent with the invention, e.g., document size, number of words/bytes changed, among others.

FIG. 24 illustrates a suitable user interface implementation of browser 30 that illustrates a number of the update status display functions consistent with the invention in greater detail. Browser 30 is shown including a main window 500 in which is displayed a current hypertext document file 502. Document 502 includes text and other multimedia objects rendered from an HTML source file, e.g., a hypertext link definition 503, a numerical field 504, and text (indicated at 506 and 508).

A user implementation of a visited list is illustrated by the updated formatting of hypertext link definition 503, where the updated status is indicated by a double underline, instead of a normal single-line format. It should be appreciated that other formats may also be used in the alternative.

A user interface implementation of a tracked list is illustrated by window 510 where it is shown that identifiers for a plurality of tracked documents, including identifiers 512 and 514, are organized in a list. Updated documents may be indicated in any of the manners described above, e.g., through display of an icon 518. Moreover, a tracked list may be organized like conventional bookmark lists, e.g., using a hierarchical arrangement of folders such as folder 516.

Furthermore, actual URL identifiers may be displayed as with identifier 512, or in the alternative, a user may be permitted to store a description that is displayed in lieu of the actual URL for the document as with identifier 514.

Also illustrated is a status pop-up window 520 that is activated whenever mouse pointer 519 is focused over a given document in the tracked list, e.g., the identifier at line 514 that corresponds to document 502 displayed in window 500. For illustration purposes, a number of trigger functions are established for document 502, and the results of these trigger functions are displayed in the status information in pop-up window 520.

For example, window 520 may display the URL for the document at 521, as well as the date in which the document was last updated, at 522. Moreover, a percentage trigger function may be established for the document, with the percentage changed illustrated at 523. A keyword search trigger function may also be established, e.g., to search for the word "BUY" in the document. If the keyword "BUY" is found (as illustrated at 506 in document 502), this status may be indicated at 524 in window 520. Moreover, a numeric trigger function may be establish to search a data field such as data field 504 of document 502. The expression established for the numeric trigger function in this example is a minimum threshold of $135.00. Accordingly, at 525, the user is notified that the value (currently $127.375) is below the threshold of the $135.00 at 525 of window 520. In addition, an author trigger function may be established to search for the user name of the last person to update the document (e.g. the user indicated at 508 of document 502). This status is indicated at 526 in window 520. It should be appreciated that a wide variety of other combinations of information may be supplied to a user consistent with the invention. Moreover, a wide variety of user interface implementations may be used in the alternative.

Additional functions may be implemented consistent with the invention. For example, it may be desirable to monitor the visited status of various documents on the tracked list such that documents that have not been visited recently may be dropped from the list, or alternatively, so that the user may be notified via a separate indication of the document, a dialog box, or other user interface mechanism.

It also may be desirable to notify a user when a document has not been updated for a predetermined time, as this may indicate an abandoned site that is no longer being maintained by its owner. Such documents may also be dropped automatically from the tracked list, or alternatively, a notification may be sent to the owner of that site requesting an update or status information therefrom (e.g., via email). It may also be desirable to indicate to a user that a notification criteria has become stale as a result of a long time period between updates.

Moreover, it may be desirable to include visually distinguish updated documents based upon the type of trigger function and/or other criteria. For example, different formats may be used to distinguish documents based upon the percentage of change (e.g., 0–20% colored red, 21–40% colored green, etc.). Other formats may be used to distinguish documents indicated as updated via a keyword search criteria vs. those indicated as updated via a numeric expression, for example.

It may also be desirable to include a "manual reset" function whereby update status information is cleared and/or reset so that all tracked and/or visited documents are updated with current update status information therefor.

Various additional modifications may be made to the above-described embodiments without departing from the spirit and scope of the invention. Therefore, the invention lies solely in the claims hereinafter appended.

What is claimed is:

1. A method of displaying a first hypertext document on a computer display, the first hypertext document including at least one hypertext link definition that points to a second hypertext document, the method comprising:
   (a) displaying the first hypertext document on the computer display, including displaying the hypertext link definition;
   (b) maintaining status information associated with a previous copy of the second hypertext document, wherein the status information associated with the previous copy of the second hypertext document is selected from the group consisting of a checksum, a document size, an author, an area selection within the previous copy of the second hypertext document, a keyword search expression, a numeric expression, a numeric threshold, a keyword list, and combinations thereof;
   (c) determining whether the second hypertext document has been updated by comparing status information for the second hypertext document with that of the previous copy of the second hypertext document; and
   (d) indicating on the computer display and within the first hypertext document whether the second hypertext document has been updated since a predetermined time.

2. The method of claim 1, wherein the predetermined time is a time in which the second hypertext document was last viewed by a user.

3. The method of claim 1, wherein indicating whether the second hypertext document has been updated includes displaying an updated status indicator proximate the hypertext link definition.

4. The method of claim 3, wherein the updated status indicator includes an icon disposed immediately adjacent the hypertext link definition.

5. The method of claim 1, wherein indicating whether the second hypertext document has been updated includes displaying the hypertext link definition in a predetermined color.

6. The method of claim 1, wherein the status information associated with the previous copy of the second hypertext document further includes at least a portion of the contents of the previous copy.

7. The method of claim 1, wherein maintaining status information includes maintaining a data structure including a plurality of records associated with a plurality of document locations, and wherein indicating whether the second hypertext document has been updated includes:
   (a) displaying the hypertext link definition in a first predetermined color if no record in the data structure is associated with the document location of the second hypertext document;
   (b) displaying the hypertext link definition in a second predetermined color if a record in the data structure is associated with the document location of the hypertext document but the second hypertext document has not been updated; and
   (c) displaying the hypertext link definition in a third predetermined color if a record in the data structure is associated with the document location of the second hypertext document and the second hypertext document has been updated.

8. The method of claim 7, wherein the data structure includes a visited list, and wherein maintaining the data structure includes:
   (a) creating a record in the visited list for each document location that is visited by a user; and
   (b) maintaining a visited count within each record, the visited count associated with a relative frequency in which the document location has been visited, wherein indicating whether the second hypertext document has been updated includes indicating that the second hypertext document has been updated only if the visited count for the record associated with the second hypertext document exceeds a predetermined threshold.

9. The method of claim 7, wherein each record is associated with a trigger function, and wherein comparing the status information includes executing the trigger function associated with the record for the document location of the second hypertext document.

10. The method of claim 9, wherein the trigger function is selected from the group consisting of a selection trigger function, a keyword trigger function, an author trigger function, a numeric trigger function, a percentage trigger function, a checksum trigger function, and combinations thereof.

11. The method of claim 1, further comprising, in response to user input, selectively displaying the status information associated with the previous copy of the second hypertext document.

12. A computer system, comprising:
   (a) a computer display; and
   (b) a processor, coupled to the computer display and configured to display on the computer display a first hypertext document including at least one hypertext link definition that points to a second hypertext document, the processor further configured to maintain status information associated with a previous copy of the second hypertext document, determine whether the second hypertext document has been updated by comparing status information for the second hypertext document with that of the previous copy of the second hypertext document, and to indicate within the first hypertext document whether the second hypertext document has been updated since a predetermined time, wherein the status information associated with the previous copy of the second hypertext document is selected from the group consisting of a checksum, a document size, an author, an area selection within the previous copy of the second hypertext document, a keyword search expression, a numeric expression, a numeric threshold, a keyword list, and combinations thereof.

13. The computer system of claim 12, wherein the predetermined time is a time in which the second hypertext document was last viewed by a user.

14. The computer system of claim 12, wherein the processor is configured to display an updated status indicator proximate the hypertext link definition.

15. The computer system of claim 14, wherein the updated status indicator includes an icon disposed immediately adjacent the hypertext link definition.

16. The computer system of claim 12, wherein the processor is further configured to display the hypertext link definition in a predetermined color.

17. The computer system of claim 12, further comprising a memory, coupled to the processor and configured to store a data structure including a plurality of records associated with a plurality of document locations, wherein the processor is further configured to:
   (a) display the hypertext link definition on the computer display in a first predetermined color if no record in the data structure is associated with the document location of the second hypertext document;

(b) display the hypertext link definition on the computer display in a second predetermined color if a record in the data structure is associated with the document location of the hypertext document but the second hypertext document has not been updated; and (c) display the hypertext link definition on the computer display in a third predetermined color if a record in the data structure is associated with the document location of the second hypertext document and the second hypertext document has been updated.

18. The computer system of claim 17, wherein the data structure includes a visited list, and wherein the processor is further configured to:

(a) create a record in the visited list for each document location that is visited by a user;

(b) maintain a visited count within each record, the visited count associated with a relative frequency in which the document location has been visited; and (c) indicate that the second hypertext document has been updated only if the visited count for the record associated with the second hypertext document exceeds a predetermined threshold.

19. The computer system of claim 17, wherein each record is associated with a trigger function, and wherein the processor is further configured to execute the trigger function associated with the record for the document location of the second hypertext document.

20. The computer system of claim 19, wherein the trigger function is selected from the group consisting of a selection trigger function, a keyword trigger function, an author trigger function, a numeric trigger function, a percentage trigger function, a checksum trigger function, and combinations thereof.

21. The computer system of claim 12, wherein the status information associated with the previous copy of the second hypertext document further includes at least a portion of the contents of the previous copy.

22. The computer system of claim 12, wherein the processor is further configured to, in response to user input, selectively display the status information associated with the previous copy of the second hypertext document.

23. The computer system of claim 12, wherein the status information associated with the previous copy of the second hypertext document includes a checksum.

24. The computer system of claim 12, wherein the status information associated with the previous copy of the second hypertext document includes a document size.

25. The computer system of claim 12, wherein the status information associated with the previous copy of the second hypertext document includes an author.

26. The computer system of claim 12, wherein the status information associated with the previous copy of the second hypertext document includes an area selection within the previous copy of the second hypertext document.

27. The computer system of claim 12, wherein the status information associated with the previous copy of the second hypertext document includes a keyword search expression.

28. The computer system of claim 12, wherein the status information associated with the previous copy of the second hypertext document includes a numeric expression.

29. The computer system of claim 12, wherein the status information associated with the previous copy of the second hypertext document includes a numeric threshold.

30. The computer system of claim 12, wherein the status information associated with the previous copy of the second hypertext document includes a keyword list.

31. A program product, comprising:

(a) a program configured to perform a method of displaying a first hypertext document on a computer display, the first hypertext document including at least one hypertext link definition that points to a second hypertext document, the method comprising:

(1) displaying the first hypertext document on the computer display, including displaying the hypertext link definition;

(2) maintaining status information associated with a previous copy of the second hypertext document, wherein the status information associated with the previous copy of the second hypertext document is selected from the group consisting of a checksum, a document size, an author, an area selection within the previous copy of the second hypertext document, a keyword search expression, a numeric expression, a numeric threshold, a keyword list, and combinations thereof;

(3) determining whether the second hypertext document has been updated by comparing status information for the second hypertext document with that of the previous copy of the second hypertext document; and (4) indicating on the computer display and within the first hypertext document whether the second hypertext document has been updated since a predetermined time; and (b) a signal bearing media bearing the program.

32. The program product of claim 31, wherein the signal bearing media is transmission type media.

33. The program product of claim 31, wherein the signal bearing media is recordable media.

34. A computer-implemented method of monitoring an update status of a document, the method comprising:

(a) in response to user selection of a selected section of a document extending between at least one set of start and end positions in the document, generating a notification criteria for the document;

(b) retrieving data associated with at least the selected section of a current copy of the document;

(c) analyzing the retrieved data to determine if the current copy of the document matches the notification criteria; and (d) if the current copy of the document matches the notification criteria, notifying a user that the document has been updated.

35. The method of claim 34, further comprising storing reference data associated with a previous copy of the document, wherein analyzing the retrieved data includes comparing the retrieved data with the reference data, and wherein the reference data includes the contents of the previous copy of the document within the selected section specified in the notification criteria.

36. The method of claim 34, wherein generating the notification criteria is responsive to user highlighting information between the start and end positions in the document using a mouse.

37. The method of claim 34, wherein the notification criteria excludes the selected section of the document.

38. The method of claim 34, wherein generating the notification criteria is responsive to user input of a content delimiter that defines the start and end positions of the selected section, the content delimiter selected from the group consisting of a format, a tag, a style, a type, a token, an object definition, and combinations thereof.

39. The method of claim 34, wherein the notification criteria further includes a threshold value, wherein analyzing the retrieved data includes comparing a data value in the retrieved data to the threshold value.

40. The method of claim 34, wherein the notification criteria further includes a numeric expression, wherein analyzing the retrieved data includes operating on a data value in the retrieved data with the numeric expression.

41. The method of claim 40, further comprising analyzing reference data associated with a previous copy of the document, including operating on a data value from the reference data with the numeric expression, wherein analyzing the retrieved data further includes comparing results of the operations on the data values from the retrieved and reference data to determine if the current copy of the document has been updated.

42. The method of claim 34, further comprising:
(a) storing the notification criteria for the document in a record in a data structure, including storing a trigger function in the record, the trigger function returning the update status of the document based upon the notification criteria therefor;
(b) storing reference data in the record, the reference data associated with a previous copy of the document; and
(c) storing a trigger data function in the record, the trigger data function storing data associated with the current copy of the document in the reference data in the record.

43. The method of claim 42, further comprising storing a trigger status function in the record, the trigger status function returning statistics associated with an update status of the document.

44. The method of claim 43, wherein the data structure includes a plurality of records, each associated with a tracked document, the method further comprising:
(a) displaying the document in a first window; and
(b) displaying an update status for each tracked document associated with each record in the data structure, including displaying the update status for each tracked document in a second window.

45. The method of claim 43, wherein the data structure includes a plurality of records, each associated with a tracked document, the method further comprising displaying a list of identifiers for the tracked documents, including indicating in association with each identifier the update status of the associated tracked document.

46. A computer-implemented method of monitoring an update status of a document, the method comprising:
(a) generating a trigger function defining a keyword search criteria for the document;
(b) retrieving data associated with a current copy of the document;
(c) analyzing the retrieved data using the keyword search criteria to determine if the current copy of the document matches the keyword search criteria; and
(d) based upon whether the current copy of the document matches the keyword search criteria, notifying a user that the document has been updated.

47. The method of claim 46, further comprising analyzing saved data from a previous copy of the document using the keyword search criteria to determine if the previous copy of the document matches the keyword search criteria, and wherein notifying the user that the document has been updated includes notifying the user when only one of the retrieved and saved data matches the keyword search criteria.

48. The method of claim 46, wherein the keyword search criteria includes a list of keywords.

49. The method of claim 48, wherein the list of keywords includes at least one of text and a delimiter selected from the group consisting of a format delimiter, a tag, a style delimiter, a type delimiter, a token, an object definition, and combinations thereof.

50. The method of claim 46, wherein the keyword search criteria includes a search expression.

51. The method of claim 50, wherein the search expression is selected from the group consisting of a boolean search expression, a natural language search expression, a wild card expression, and combinations thereof.

52. A computer-implemented method of monitoring an update status of a document, the method comprising:
(a) generating a trigger function defining a notification criteria for the document, the notification criteria identifying at least one author;
(b) retrieving data associated with a current copy of the document;
(c) analyzing the retrieved data using the trigger function to determine if the current copy of the document has been updated by the author; and
(d) selectively notifying a user that the document has been updated based upon whether the current copy of the document has been updated by the author.

53. The method of claim 52, wherein selectively notifying the user includes notifying the user when the document has been updated by the author.

54. The method of claim 52, wherein selectively notifying the user includes notifying the user when the document has been updated by someone other than the author.

55. The method of claim 52, further comprising:
(a) generating a checksum for the current copy of the document;
(b) retrieving a checksum for a previous copy of the document; and
(c) comparing the checksums for the current and previous copies of the document to determine whether the document has been updated.

56. The method of claim 55, wherein selectively notifying the user includes notifying the user only when the checksums for the current and previous copies of the document are different.

57. The method of claim 52, wherein analyzing the retrieved data includes searching the retrieved data for a username for the author.

58. The method of claim 57, wherein searching the retrieved data for the username includes searching for a tag in the document.

59. A computer-implemented method of monitoring an update status of a document, the method comprising:
(a) retrieving data associated with a current copy of the document;
(b) comparing the retrieved data with data associated with a previous copy of the document to determine a relative change between the current and previous copies of the document; and
(c) if the relative change exceeds a threshold value, notifying a user that the document has been updated.

60. The method of claim 59, further comprising saving a copy of the contents of the previous copy of the document, wherein comparing the retrieved data includes retrieving the saved copy of the contents of the previous copy of the document.

61. The method of claim 59, further comprising saving a list of non-common words from the previous copy of the document, wherein retrieving data includes generating a list of non-common words for the current copy of the document, and wherein comparing the retrieved data includes comparing the lists of non-common words for the current and previous copies of the document.

62. The method of claim 61, wherein the non-common words exclude tags and formatting information.

63. The method of claim 61, wherein saving the list of non-common words from the previous copy of the document includes saving a count for each non-common word, the count associated with a number of occurrences of the associated non-common word in the previous copy of the document, wherein retrieving data further includes determining a count for each non-common word in the current copy of the document, and wherein comparing the retrieved data further includes comparing the counts of the non-common words for the current and previous copies of the document.

64. The method of claim 63, wherein comparing the retrieved data further includes summing in a first variable the maximum number of occurrences of each non-common word in either of the current and previous copies of the document, and summing in a second variable the number of duplicate occurrences of each non-common word in the current and previous copies of the document, wherein the relative change is related to the ratio of the first and second variables.

65. A method of displaying a first hypertext document on a computer display, the first hypertext document including at least one hypertext link definition that points to a second hypertext document, the method comprising:

(a) displaying the first hypertext document on the computer display, including displaying the hypertext link definition;

(b) maintaining a visited count for each of a plurality of document locations visited by a user, each visited count associated with a relative frequency in which an associated document location has been visited; and (d) indicating on the computer display and within the first hypertext document whether the second hypertext document has been updated since a predetermined time only if the visited count for a document location associated with the second hypertext document exceeds a predetermined threshold.

66. A computer system, comprising:

(a) a computer display; and (b) a processor, coupled to the computer display and configured to display on the computer display a first hypertext document including at least one hypertext link definition that points to a second hypertext document, the processor further configured to maintain a visited count for each of a plurality of document locations visited by a user, each visited count associated with a relative frequency in which an associated document location has been visited, and to indicate on the computer display and within the first hypertext document whether the second hypertext document has been updated since a predetermined time only if the visited count for a document location associated with the second hypertext document exceeds a predetermined threshold.

* * * * *